(12) United States Patent
Oyobe et al.

(10) Patent No.: US 7,423,391 B2
(45) Date of Patent: Sep. 9, 2008

(54) POWER CONVERSION DEVICE AND VEHICLE EQUIPPED THEREWITH

(75) Inventors: Hichirosai Oyobe, Toyota (JP); Tetsuhiro Ishikawa, Nishikamo-gun (JP); Tsuyoshi Yano, Nishikamo-gun (JP); Masahiro Kimata, Kawanishi (JP); Gourab Majumdar, Fukuoka (JP); Yoshiharu Yu, Fukuoka (JP)

(73) Assignees: Toyota Jidosha Kabushiki Kaisha, Toyota (JP); Mitsubishi Electric Corporation, Tokyo (JP)

( * ) Notice: Subject to any disclaimer, the term of this patent is extended or adjusted under 35 U.S.C. 154(b) by 122 days.

(21) Appl. No.: 11/579,272

(22) PCT Filed: May 18, 2005

(86) PCT No.: PCT/JP2005/009506

§ 371 (c)(1),
(2), (4) Date: Nov. 1, 2006

(87) PCT Pub. No.: WO2005/119897

PCT Pub. Date: Dec. 15, 2005

(65) Prior Publication Data

US 2008/0024078 A1 Jan. 31, 2008

(30) Foreign Application Priority Data

Jun. 3, 2004 (JP) ............................. 2004-166249

(51) Int. Cl.
*H02M 7/797* (2006.01)
*B60L 11/18* (2006.01)

(52) U.S. Cl. ...................... 318/139; 318/558; 180/65.3; 363/123

(58) Field of Classification Search ................. 318/139, 318/558; 180/65.1, 65.3; 363/123
See application file for complete search history.

(56) References Cited

U.S. PATENT DOCUMENTS 3,320,565 A 5/1967 Campbell et al.

(Continued)

FOREIGN PATENT DOCUMENTS

EP 1 286 405 A1 2/2003

(Continued)

OTHER PUBLICATIONS

S. Hosseini et al., "A Novel Modulation Method for DC/AC Matrix Converters Under Distorted DC Supply Voltage," IEEE Tencon '02, 2002 IEEE Region 10 Conference on Computers, Communications, Control and Power Engineering Proceedings, vol. 1, pp. 1970-1973, Oct. 28, 2002.

(Continued)

*Primary Examiner*—Bentsu Ro
(74) *Attorney, Agent, or Firm*—Oliff & Berridge, PLC

(57) ABSTRACT

A power conversion portion (10) and a connection portion (20) converting power between a fuel cell (FC) and a battery (BAT) corresponding to dc power supply and a motor generator (MG) corresponding to an ac machine, are configured of a matrix converter. For a power flow pattern requiring that the dc power supply provide high voltage, a switch (SCd) in the connection portion (20) operates in response to a control signal received from a control device (30) to electrically connect a power supply line (LC) to a power supply line (Ld) to connect the fuel cell (FC) and the battery (BAT) in series.

24 Claims, 16 Drawing Sheets

U.S. PATENT DOCUMENTS

| | | |
|---|---|---|
| 4,363,999 A | 12/1982 | Preikschat |
| 5,969,624 A * | 10/1999 | Sakai et al. .............. 340/636.1 |
| 6,268,711 B1 * | 7/2001 | Bearfield .................... 320/117 |
| 6,718,927 B2 * | 4/2004 | Goetze et al. ............ 123/179.3 |
| 6,923,279 B2 * | 8/2005 | Shimane et al. ............ 180/65.1 |
| 7,075,194 B2 * | 7/2006 | Weidenheimer et al. ...... 307/71 |
| 7,122,991 B2 * | 10/2006 | Kitajima et al. ............. 318/800 |
| 2001/0026427 A1 | 10/2001 | Mahlein et al. |

FOREIGN PATENT DOCUMENTS

| | | |
|---|---|---|
| JP | A 2002-534050 | 10/2002 |
| WO | WO 00/38306 | 6/2000 |

OTHER PUBLICATIONS

J. Ejea et al., "Implementation of Bi-Directional AC-DC Matrix Converter," Electronics Letters, vol., 38, No. 16, pp. 933-934, Aug. 1, 2002.

* cited by examiner

SCa,SDa,SCb,SDb,SCc,SDc

SCa,SDa,SCb,SDb,SCc,SDc

POWER CONVERSION DEVICE AND VEHICLE EQUIPPED THEREWITH

TECHNICAL FIELD

The present invention relates to power conversion devices and vehicles equipped therewith and particularly to power conversion devices employing a matrix converter and vehicles equipped therewith.

BACKGROUND ART

In recent years as energy conservation and environmental issues are increasingly discussed, electric vehicles are increasingly noted. Electric vehicles are vehicles having as a source of power a direct current (dc) power supply, an inverter, and a motor driven by the inverter.

One such conventionally known electric vehicle is a fuel cell vehicle employing a fuel cell for a dc power supply. Generally a fuel cell vehicle is equipped with a secondary battery for recovering energy regenerated by a motor in a regeneration mode, and uses the regenerated power to charge the secondary battery and uses the fuel cell and the secondary battery together to supply power of high voltage to the motor.

More specifically in such fuel cell vehicle the motor is generally implemented by an alternating current (ac) motor and the fuel cell and/or the secondary battery output(s) dc power which is in turn converted to ac power and supplied to the ac motor, and when the ac motor regeneratively operates it generates ac power which is in turn converted to dc power charging the secondary battery, and furthermore the fuel cell outputs dc power which is converted in voltage to a prescribed dc voltage to charge the secondary battery. Thus between the fuel cell, the secondary battery and the ac motor a variety of voltage conversions is effected.

Conventionally, such conversion of power between a plurality of dc power supplies and an ac motor has generally been performed by a power conversion device that combines an inverter performing dc-ac conversion and a converter performing conversion in voltage between direct currents.

In recent years, matrix converter has been noted as a new power conversion device. Generally it is known as a converter capable of directly converting an alternating current to an alternating current without temporarily converting it to a direct current. For example, it is well known as bi-directional switches arranged in a matrix of three rows and three columns and directly converting a prescribed 3-phase ac voltage output from a 3-phase ac power supply to a 3-phase ac voltage of any voltage and frequency.

Such a matrix converter is employed in an electric system, as disclosed in U.S. Patent Application Publication No. 2001/0026427, which discloses an overvoltage protection device employing a matrix converter.

DISCLOSURE OF THE INVENTION

A matrix converter does not have a capacitor, a reactor and the like provided in conventional power conversion devices at a converter. As such, the device can be small in size and also free of noise otherwise generated by the reactor. For vehicles requiring that the device be miniaturized and quiet in particular, the matrix converter is expected to serve as a power conversion device.

U.S. Patent Application Publication No. 2001/0026427 discloses an application of a matrix converter to an electric system. The matrix converter disclosed herein, however, operates to perform power conversion between alternating currents between a main system outputting 3-phase ac power and a 3-phase asynchronous ac motor and in a fuel cell vehicle as described above cannot convert power between a plurality of dc power supplies and an ac motor. Furthermore, this matrix converter can neither use a plurality of power supplies together to supply an ac motor with ac power nor select and charge a rechargeable power supply (or a secondary battery) when the ac motor regeneratively operates.

Furthermore when the ac motor regeneratively operates, normally controlling generation requires that electromotive voltage generated at the ac motor be lower than voltage of the secondary battery serving as a battery, and there is a demand for a power conversion device employing a matrix converter that does not require a separate converter to be capable of communication of regeneration to the secondary battery, as desired, if the ac motor's maximum electromotive voltage is higher than the secondary battery's voltage level, i.e., if the secondary battery's voltage level is low.

The present invention has been made to overcome such disadvantage and contemplates a power conversion device employing a matrix converter converting power between a plurality of dc power supplies and a multi-phase ac machine.

The present invention also contemplates a vehicle equipped with a power conversion device employing a matrix converter converting power between a plurality of dc power supplies and a multi-phase ac machine.

The present power conversion device includes: a matrix converter connected to m direct current power supplies and an n-phase alternating current machine, m and n each representing a natural number of at least two; and a control device controlling an operation of the matrix converter, wherein the matrix converter includes a power conversion portion operative in response to a control signal received from the control device to convert power between the m direct current power supplies and the n-phase alternating current machine, and a connection portion operative in response to a control signal received from the control device to series connect i ones of the m direct current power supplies, i representing a natural number of at least two and at most m, and the power conversion portion receives one of direct current power output from each of the m direct current power supplies and that output from the i direct current power supplies series connected by the connection portion to convert the direct current power to alternating current power and output the alternating current power to the n-phase alternating current machine, or receives alternating current power from the n-phase alternating current machine to convert the alternating current power to direct current power and output the direct current power to any of the m direct current power supplies.

Preferably the power conversion portion operates in response to the control signal received from the control device to further communicate power between the m direct current power supplies.

Preferably the matrix converter further includes 2×m first power supply lines associated with the m direct current power supplies and connected to m pairs of positive and negative electrodes, respectively, of the m direct current power supplies, and n second power supply lines connected to n input/output terminals, respectively, of the n-phase alternating current machine, and the power conversion portion is configured of 2×m×n bi-directional switches provided between the 2×m first power supply lines and the n second power supply lines, respectively.

Preferably the connection portion is configured of a first switch group including a plurality of switches capable of electrically interconnecting the 2×m first power supply lines.

Preferably the connection portion is configured of a second switch group corresponding to the first switch group minus m switches capable of short-circuiting each of m pairs of first power supply lines connected to the m direct current power supplies, respectively.

Preferably the connection portion is configured of a third switch group corresponding to the second switch group minus a switch by connecting a plurality of series-, forward-connected direct current power supplies in random order.

Preferably the connection portion is configured of a fourth switch group corresponding to the third switch group minus a switch by connecting a plurality of series-, reverse-connected direct current power supplies in random order.

Preferably the connection portion is configured of a fourth switch group corresponding to the third switch group minus a switch series-, reverse-connecting a plurality of direct current power supplies.

Preferably when the power conversion portion receiving alternating current power from the n-phase alternating current machine converts the alternating current power to direct current power and outputs the direct current power to any of the m direct current power supplies any switch included in the connection portion is turned off.

Preferably the power conversion portion has 2×j×n bi-directional switches replaced with 2×j×n monodirectional switches provided between 2×j first power supply lines connected to j direct current power supplies non-chargeable from the positive and negative electrodes and the n second power supply lines, respectively, j being a natural number smaller than m.

Preferably, the m direct current power supplies include a fuel cell and a secondary battery, the n-phase alternating current machine is implemented by a 3-phase alternating current rotary electric machine, the power conversion portion includes six monodirectional switches provided between a pair of first power supply lines connected to positive and negative electrodes, respectively, of the fuel cell and three second power supply lines connected to phase coils, respectively, of the 3-phase alternating current rotary electric machine, and six bi-directional switches provided between another pair of first power supply lines connected to positive and negative electrodes, respectively, of the secondary battery and the three second power supply lines, and the connection portion is configured of a bi-directional switch provided between one of the first power supply lines of the pair connected to the negative electrode of the fuel cell and one of the first power supply lines of the other pair connected to the positive electrode of the secondary battery or between the other of the first power supply lines of the pair connected to the positive electrode of the fuel cell and the other of the first power supply lines of the other pair connected to the negative electrode of the secondary battery.

Preferably the power conversion device further includes m capacitors associated with the m direct current power supplies and each connected between first power supply lines of a pair connected to a corresponding one of the direct current power supplies.

Preferably when the 3-phase alternating current rotary electric machine outputs alternating current power to the power conversion portion in a regeneration operation and the 3-phase alternating current rotary electric machine provides a maximum electromotive voltage of at least an inter-terminal voltage of the secondary battery, the control device outputs a control command to the 3-phase alternate rotary electric machine to reduce a rotation rate thereof, the 3-phase alternating current rotary electric machine operates a mechanical brake in response to the control command to reduce the rotation rate, and after the rotation rate is reduced the power conversion portion receiving alternating current power from the n-phase alternating current rotary electric machine converts the alternating current power to direct current power and outputs the direct current power to any of the m direct current power supplies.

Preferably the control device reduces the rotation rate of the 3-phase alternating current rotary electric machine to reduce the maximum electromotive voltage to be lower than the inter-terminal voltage.

Preferably when the 3-phase alternating current rotary electric machine outputs alternating current power to the power conversion portion in a regeneration operation and the 3-phase alternating current rotary electric machine provides a maximum electromotive voltage of at least an inter-terminal voltage of the secondary battery, the control device further controls an operation of the matrix converter to weaken a magnetic field of the 3-phase alternate rotary electric machine, and after the magnetic field is weakened the power conversion portion receiving alternating current power from the n-phase alternating current rotary electric machine converts the alternating current power to direct current power and outputs the direct current power to any of the m direct current power supplies.

Preferably the control device controls the operation of the matrix converter to weaken the magnetic field to reduce the maximum electromotive voltage to be smaller than the inter-terminal voltage.

Preferably the control device controls the operation of the matrix converter to generate a d axis current for weakening the magnetic field of the 3-phase alternating current rotary electric machine.

Preferably the control device turns on the monodirectional switch in the connection portion.

The present vehicle includes m direct current power supplies, m representing a natural number of at least two; an n-phase alternating current rotary electric machine, n representing a natural number of at least two; and the above described power conversion device provided between the m direct current power supplies and the n-phase alternating current rotary electric machine.

Preferably the m direct current power supplies include at least one fuel cell and at least one secondary battery.

Preferably the matrix converter connects i ones of the m direct current power supplies in series in accordance with a level of power supplied to the n-phase alternating current rotary electric machine, and receives direct current power generated by the i, series connected direct current power supplies to convert the direct current power to n-phase alternating current power and supply the n-phase alternating current power to the n-phase alternating current rotary electric machine, i being a natural number of at most m.

Preferably when the n-phase alternating current rotary electric machine regeneratively operates, the matrix converter receives n-phase alternating current power from the n-phase alternating current rotary electric machine and converts the n-phase alternating current power to direct current power to charge the at least one secondary battery therewith.

Preferably when the m direct current power supplies mutually communicate power, the control device controls an operation of the matrix converter to generate a voltage pattern providing the n-phase alternating current rotary electric machine with a q axis current of 0.

In the present power conversion device m dc power supplies and an n-phase ac machine have a matrix converter connected thereto, and the matrix converter includes a power conversion portion converting power between the m dc power supplies and the n-phase ac machine and a connection portion capable of i ones of the m dc power supplies in series so that in accordance with a power flow pattern between the m dc power supplies and the n-phase ac machine a circuit configuration is dynamically converted between the m dc power supplies and the n-phase ac machine by the connection portion and in addition thereto the power conversion portion converts power between the m dc power supplies and the n-phase ac machine.

Thus in accordance with the present invention a variety of power communications can be achieved between the m dc power supplies and the n-phase ac machine, and any ac voltage can be generated within a range of maximum dc voltage provided when the m dc power supplies are connected in series, and the ac voltage can be supplied to the n-phase ac machine. Furthermore, the present power conversion device can dispense with a reactor, a capacitor and the like that conventional power conversion devices are equipped with. The present power conversion device can be reduced in size and free of noise attributed to the reactor so that improved quietness can be achieved.

Furthermore in the present power conversion device an unnecessary switch is eliminated in accordance with a condition for connecting the dc power supply by the connection portion. The connection portion can be configured of an appropriate number of switches corresponding to the condition of use of interest.

Thus the power conversion device can be formed of a minimally required number of switches corresponding to the condition of use of interest.

Furthermore in the present power conversion device a switch of the power conversion device connected to a first power supply line connected to a non-chargeable dc power supply is a monodirectional switch, and a power element passing a current in an unwanted direction can thus be eliminated.

Thus a power conversion device having an excess and deficiency-free, appropriate switching configuration, can be achieved.

Furthermore in the present power conversion device a capacitor is provided between first power supply lines connected to the dc power supply's positive and negative electrodes. The first power supply line's voltage variation can be reduced.

Thus the present invention can reduce an effect on each equipment of a ripple attributed to a switching operation.

Furthermore in the present power conversion device when the 3-phase ac rotary electric machine outputs ac voltage to the power conversion portion in a regeneration operation and the 3-phase ac rotary electric machine's maximum electromotive voltage is equal to or larger than at least the secondary battery's inter-terminal voltage, a mechanical brake is used to reduce the 3-phase ac rotary electric machine's rotation rate and hence electromotive voltage.

Thus the present invention can achieve communication of regeneration from the 3-phase ac rotary electric machine to the secondary battery regardless of the secondary battery's inter-terminal voltage.

Furthermore in the present power conversion device in the regenerative operation when the 3-phase ac rotary electric machine's maximum electromotive voltage is equal to or larger than the secondary battery's inter-terminal voltage the 3-phase ac rotary electric machine's magnetic field can be weakened and the 3-phase ac rotary electric machine's electromotive voltage can thus be reduced.

Thus the present invention can achieve communication of regeneration from the 3-phase ac rotary electric machine to the secondary battery regardless of the secondary battery's inter-terminal voltage.

Furthermore in the present power conversion device in the regenerative operation when the 3-phase ac rotary electric machine's maximum electromotive voltage is equal to or larger than the secondary battery's inter-terminal voltage the control device generates a d axis current for weakening a magnetic field of the 3-phase ac rotary electric machine and turns on a monodirectional switch in the connection portion to provide increased dc voltage.

Thus the present invention can provide more responsive d axis current control and as a result a highly responsive operation of regeneration from the 3-phase ac rotary electric machine to the secondary battery.

Furthermore the present invention provides a vehicle including m dc power supplies, an n-phase ac rotary electric machine, and the above described power conversion device converting power between the m dc power supplies and the n-phase ac rotary electric machine. Therefore the m dc power supplies and the n-phase ac rotary electric machine can communicate power variously in accordance with power flow patterns. Furthermore, a reactor, a capacitor and the like can be dispensed with, and reduced size and increased quietness, as required in particular for vehicles, can be achieved.

Furthermore in the present vehicle when m dc power supplies communicate power, a voltage pattern is generated to provide the n-phase ac rotary electric machine with a q axis current of 0. In the n-phase ac rotary electric machine no rotation torque is generated.

Thus a vehicle sufficiently considering safety can be provided.

BEST MODE FOR CARRYING OUT THE INVENTION

Hereinafter the present invention will be described in embodiments with reference to the drawings more specifically. In the figures, identical or like components are identically denoted.

First Embodiment

Figure 1:
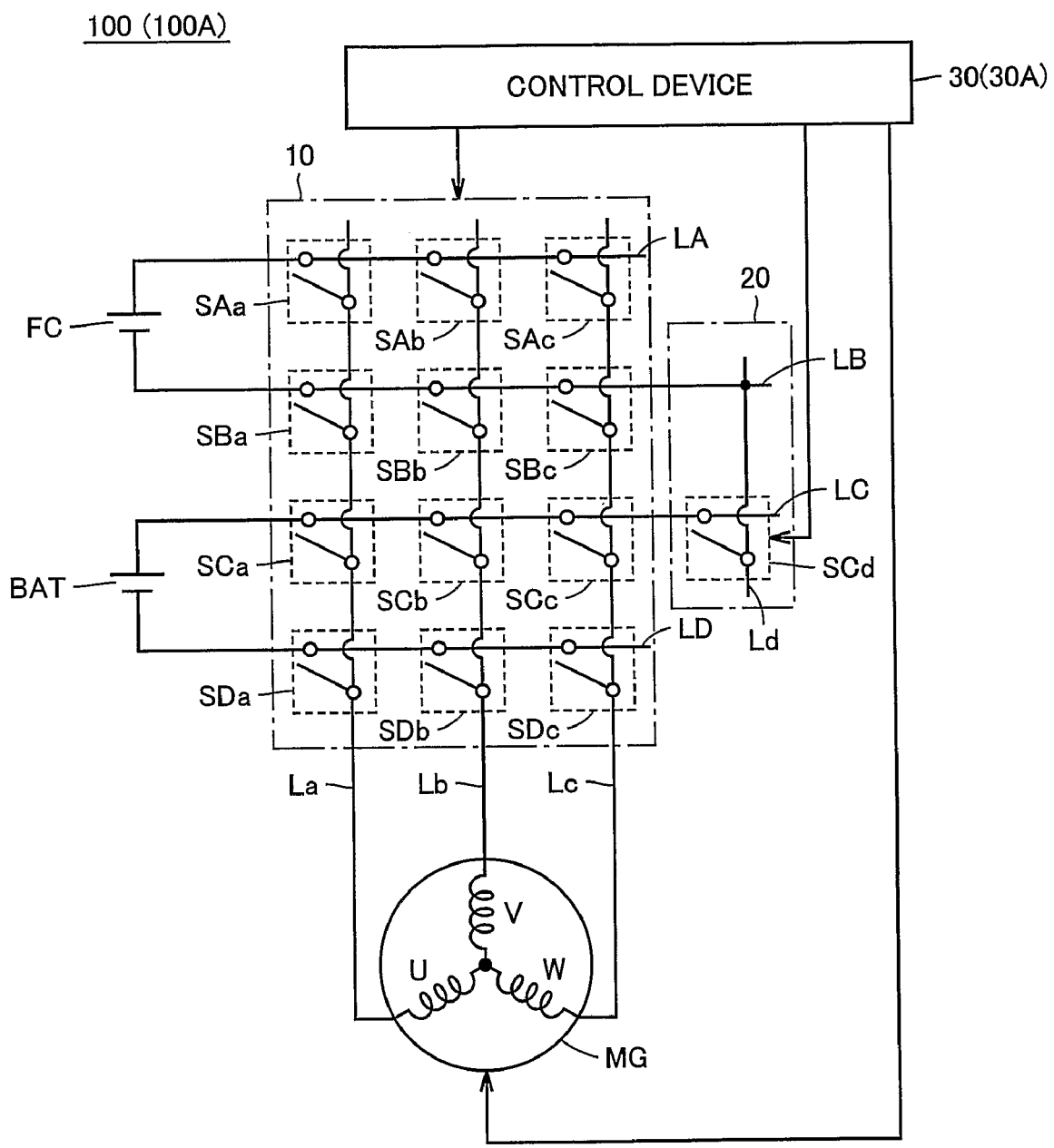
FIG. 1 is an electrical circuit diagram showing a configuration of a main portion of a power system in a fuel cell vehicle having the present power conversion device of a first embodiment mounted therein.

FIG. 1 is an electrical circuit diagram showing a configuration of a main portion of a power system in a fuel cell vehicle having the present power conversion device of the first embodiment mounted therein.

With reference to the figure, a fuel cell vehicle 100 includes a power conversion portion 10, a connection portion 20, a control device 30, a fuel cell FC, a battery BAT, and a motor generator MG.

Fuel cell FC is dc power generating cell obtaining electrical energy from energy generated by a chemical reaction caused for example between hydrogen or similar fuel and oxidizer. Fuel cell FC generates dc power which is in turn supplied to power conversion portion 10. Battery BAT is for example a secondary battery for example of nickel metal hydride or lithium ion or the like. Battery BAT supplies dc power to voltage conversion portion 10 and is charged with dc power received from power conversion portion 10.

Motor generator MG is a 3-phase ac synchronous motor generator and includes a rotor (not shown) having an external circumferential surface provided with a plurality of permanent magnets and a stator (not shown) having wound therearound a 3-phase coil creating a rotating magnetic field. Motor generator MG operates as a motor rotatively driving the rotor by an interaction of a magnetic field generated by the permanent magnet and that generated by the 3-phase coil, and also operates as a power generator generating electromotive force at opposite ends of the 3-phase coil by an interaction of the magnetic field generated by the permanent magnet and the rotor's rotation.

Power conversion portion 10 receives dc power from fuel cell FC or battery BAT and converts the dc power to ac power and outputs the ac power to motor generator MG. Furthermore, when connection portion 20, which will be described hereinafter, connects fuel cell FC and battery BAT in series and the series connected fuel cell FC and battery BAT output dc power of high voltage, power conversion portion 10 converts the dc power to ac power and outputs the ac power to motor generator MG. Furthermore, power conversion portion 10 converts ac power generated by motor generator MG to dc power and charges battery BAT therewith.

Connection portion 20 operates in response to a control signal received from control device 30 to connect fuel cell FC and battery BAT in series by interconnecting a power supply line LC connected to a positive electrode of battery BAT and a power supply line LB connected to a negative electrode of fuel cell FC.

Control device 30 controls power conversion portion 10 and connection portion 20 to cause motor generator MG to generate a torque corresponding to a motor torque command in accordance with power supplied from fuel cell FC and/or battery BAT.

More specifically, when dc voltage provided from fuel cell FC or battery BAT alone is used to drive motor generator MG, control device 30 outputs a control signal to connection portion 20 to electrically disconnect power supply line LC from power supply line LB, and outputs a pulse width modulation (PWM) signal to power conversion portion 10 to convert dc power of fuel cell FC or battery BAT to ac power and output the ac power to motor generator MG.

Furthermore when fuel cell FC and battery BAT are series connected to drive motor generator MG, control device 30 outputs a control signal to connection portion 20 to electrically interconnect power supply lines LC and LB, and outputs the PWM signal to power conversion portion 10 to convert dc power of fuel cell FC and battery BAT series connected by connection portion 20 to ac power and output the ac power to motor generator MG.

Furthermore control device 30 controls power conversion portion 10 and connection portion 20 to convert ac power generated by motor generator MG to dc power to charge battery BAT therewith. More specifically, control device 30 outputs a control signal to connection portion 20 to electrically disconnect power supply lines LC and LB, and outputs a control signal to power conversion portion 10 to rectify ac power generated by motor generator MG to dc power and also up convert electromotive voltage Vmg generated at motor generator MG to an inter-terminal voltage Vbat of battery BAT.

Note that in the above described regeneration operation, normally controlling regeneration requires that electromotive voltage Vmg generated at motor generator MG have a maximum value smaller than the battery BAT inter-terminal voltage Vbat. Accordingly, when the electromotive voltage Vmg has a maximum value equal to or larger than inter-terminal voltage Vbat, control device 30 outputs a braking command to motor generator MG to brake motor generator MG by mechanical braking, and when the electromotive voltage Vmg maximum value is reduced to be smaller than interterminal voltage Vbat, control device 30 outputs the above described control signal to power conversion portion 10.

In fuel cell vehicle 100 power conversion portion 10 converts dc power provided from fuel cell FC to ac power and supplies the dc power to motor generator MG. Furthermore power conversion portion 10 can also convert dc power provided from battery BAT to ac power and supplies the ac power to motor generator MG.

Furthermore, power conversion portion 10 can receive dc power from fuel cell FC and battery BAT series connected by connection portion 20 and convert the dc voltage to ac voltage, and supply the ac voltage to motor generator MG. Furthermore power conversion portion 10 can also receive ac power generated by regeneratively operating motor generator MG and convert the ac voltage to dc voltage, and supply the dc voltage to battery BAT.

Power conversion portion 10 and connection portion 20 are configured by a matrix converter. Power conversion portion 10 includes switches SAa-SDa, SAb-SDb, SAc-SDc and power supply lines LA-LD, La-Lc. Connection portion 20 includes a switch SCd and a power supply line Ld.

Power supply lines LA, LB are connected to fuel cell FC at positive and negative electrodes, respectively. Power supply lines LC, LD are connected to battery BAT at positive and negative electrodes, respectively. Power supply lines La-Lc are connected to sides of U-, V- and W-phase coils, respectively, of motor generator MG that are opposite to the neutral point. Furthermore, power supply line Ld is connected to power supply line LB.

Switches SAa, SBa, SAb, SBb, SAc, SBc, SCd are each implemented by a monodirectional switch. Switches SAa, SAb, SAc are connected between power supply line LA and power supply lines La, Lb, Lc, respectively, and operate in response to the PWM signal received from control device 30 to pass a current from power supply line LA to power supply lines La, Lb, Lc, respectively. Switches SBa, SBb, SBc are connected between power supply line LB and power supply lines La, Lb, Lc, respectively, and operate in response to the PWM signal received from control device 30 to pass a current from power supply lines La, Lb, Lc, respectively, to power supply line LB. Switch SCd is connected between power supply line LC and power supply line Ld and operates in response to a control signal received from control device 30 to pass a current from power supply line LC to power supply line Ld.

Switches SCa, SDa, SCb, SDb, SCc, SDc are each a bi-directional switch. Switches SCa, SCb, SCc are connected between power supply line LC and power supply lines La, Lb, Lc, respectively, and switches SDa, SDb, SDc are connected between power supply line LD and power supply lines La, Lb, Lc, respectively. When battery BAT supplies power to motor generator MG, switches SCa, SCb, SCc operate in response to the PWM signal received from control device 30 to pass a current from power supply line LC to power supply lines La, Lb, Lc, respectively, and switches SDa, SDb, SDc operate in response to the signal to pass a current from power supply lines La, Lb, Lc to power supply line LD. Furthermore, when motor drive MG supplies power to battery BAT, switches SCa, SDa, SCb, SDb, SCc, SDc operate in response to a control signal received from control device 30 to rectify ac power received from power supply lines La, Lb, Lc and supply it to battery BAT.

Control device 30 receives a motor torque command value, the value of a current of each phase of motor generator MG, and the voltage output from fuel cell FC and battery BAT, and calculates the voltage of each phase coil of motor generator MG. The value of the current of each phase of motor generator MG is detected by a current sensor (not shown) and the voltage output from fuel cell FC and battery BAT is detected by a voltage sensor (not shown).

Control device 30 is driven by a power flow pattern of fuel cell vehicle 100 and the calculated voltage of each phase of motor generator MG to generate a PWM signal for supplying desired power from fuel cell FC and/or battery BAT to motor generator MG and output the generated PWM signal to each switch SAa-SDa, SAb-SDb, SAc-SDc.

Furthermore control device 30 is driven by a power flow pattern of fuel cell vehicle 100 to generate a control signal for connecting fuel cell FC and battery BAT in series and output the generated control signal to switch SCd.

Furthermore control device 30 detects voltage of each phase of motor generator MG and inter-terminal voltage of fuel cell FC and battery BAT and is driven thereby to generate a control signal for supplying power from motor generator MG or fuel cell FC to battery BAT and output the generated control signal to each switch SAa-SDa, SAb-SDb, SAc-SDc. The voltage of each phase of motor generator MG is detected by a voltage sensor (not shown).

The fuel cell vehicle 100 power flow pattern and specific operation of control device 30, power conversion portion 10 and connection portion 20 in accordance therewith will be described later more specifically.

Note that in the above, motor generator MG corresponds to a "3-phase ac rotary electric machine" and power supply lines LA-LD correspond to a "first power supply line" and power supply lines LA-LC correspond to a "second power supply line".

Figure 2:
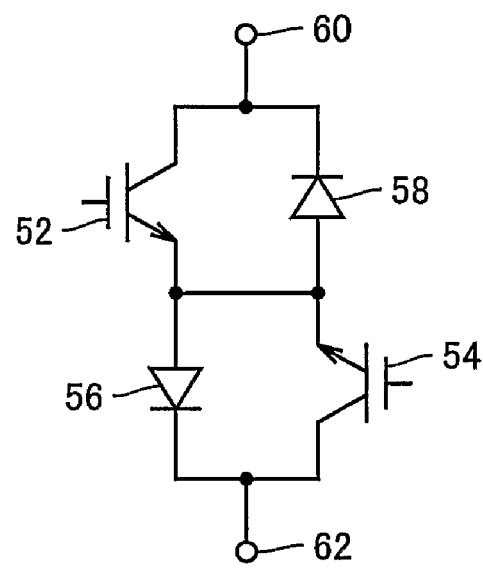
FIG. 2 is a circuit diagram of a configuration of a bi-directional switch shown in FIG. 1.

FIG. 2 is a circuit diagram showing a configuration of a bi-directional switch shown in FIG. 1.

With reference to the figure, the bi-directional switch configures switch SCa, SDa, SCb, SDb, SCc, SDc each including power semiconductor elements 52, 54, and diodes 56, 58. Power semiconductor element 52, 54 is implemented for example by an insulated gate bipolar transistor (IGBT).

Power semiconductor element 52 has a collector connected to a terminal 60, an emitter to an anode of diode 56, and a base receiving a control signal from control device 30 (not shown). Diode 56 has an anode connected to an emitter of power semiconductor element 52, and a cathode to a terminal 62.

Furthermore, power semiconductor element 54 has a collector connected to terminal 62, an emitter to an anode of diode 58, and a base receiving a control signal from control device 30. Diode 58 has an anode connected to an emitter of power semiconductor device 54 and a cathode to terminal 60.

Power semiconductor element 52 and diode 56 are interconnected at a point which is connected to that interconnecting power semiconductor element 54 and diode 58. Terminals 60, 62 are connected to two corresponding power supply lines, respectively.

When this switch receives an active control signal from control device 30, power semiconductor element 52 can turn on to pass a current from terminals 60 to 62 via power semiconductor element 52 and diode 56. Furthermore when the switch receives an active control signal from control device 30, power semiconductor element 54 can also turn on to pass a current from terminals 62 to 60 via power semiconductor element 54 and diode 58.

As such, when the switch receives active control signal from control device 30 and terminal 60 is higher in voltage than terminal 62, a current flows from terminals 60 to 62 via power semiconductor element 52 and diode 56. Diode 58 is reverse-biased, and power semiconductor element 54 does not have a current flowing therethrough in the opposite direction. When the switch receives active control signal from control device 30 and terminal 62 is higher in voltage than terminal 60, a current flows from terminals 62 to 60 via power semiconductor element 54 and diode 58. Diode 58 is reverse-biased, and power semiconductor element 52 does not have a current flowing therethrough in the opposite direction.

Figure 3:
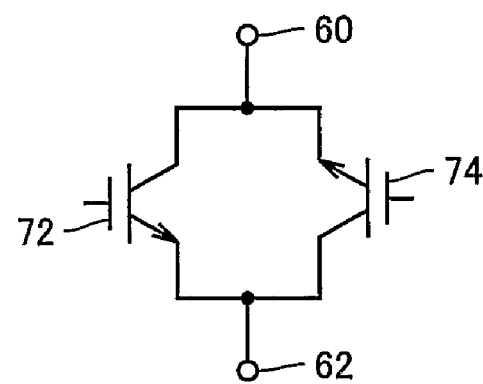
FIG. 3 is a circuit diagram showing another configuration of the FIG. 1 bi-directional switch.

FIG. 3 is a circuit diagram showing another configuration of the bi-directional switch shown in FIG. 1.

With reference to the figure, the bi-directional switch configures switch SCa, SDa, SCb, SDb, SCc, SDc each including power semiconductor elements 72, 74 implemented by an IGBT having a reverse-blocking function. This IGBT has sufficient dielectric strength withstanding voltage applied to the element in the opposite direction.

Power semiconductor element 72 has a collector and an emitter connected to terminals 60 and 62, respectively, and a base receiving a control signal from control device 30 (not shown). Power semiconductor element 74 has a collector and an emitter connected to terminals 62 and 60, respectively, and a base receiving a control signal from control device 30.

When this switch receives active control signal from control device 30, power semiconductor elements 72 and 74 both turn on. As such, when the switch receives the active control signal from control device 30 and terminal 60 is higher in voltage than terminal 62, a current flows from terminals 60 to 62 via power semiconductor element 72. Although power semiconductor element 74 is reverse-biased, power semiconductor element 74 will not be destroyed as it has the sufficient dielectric strength. Furthermore, when the switch receives active control signal from control device 30 and terminal 62 is higher in voltage than terminal 60, a current flows from terminals 62 to 60 via power semiconductor element 74. Although power semiconductor element 72 is reverse-biased, power semiconductor element 72 also will not be destroyed as it has the sufficient dielectric strength.

Note that although not particularly shown, monodirectional switch SAa, SBa, SAb, SBb, SAc, SBc is each implemented for example by an IGBT or similar power semiconductor element.

FIGS. 4-18 illustrate a specific operation of control device 30, power conversion portion 10 and connection portion 20 in accordance with a power flow pattern of the FIG. 1 fuel cell vehicle 100, and a flow of a current. For fuel cell vehicle 100 there exist the following six power flow patterns P1-P6:

P1: Fuel cell FC is in a powering mode (or outputs power) and motor generator MG performs the powering operation;

P2: Fuel cell FC and battery BAT are in the powering mode and motor generator MG performs the powering operation;

P3: Fuel cell FC is in the powering mode, motor generator MG performs the powering operation, and battery BAT is in a regeneration mode (or charged);

P4: Motor generator MG regeneratively operates and battery BAT is in the regeneration mode;

P5: Battery BAT in the powering mode and motor generator MG performs the powering operation; and P6: Fuel cell FC is in the powering mode and battery BAT is in the regeneration mode.

Figure 4:
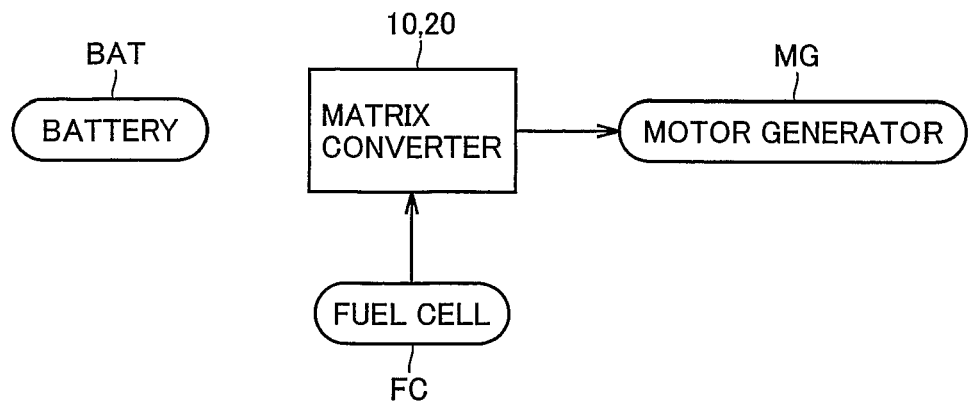
FIG. 4 is a block diagram showing a flow of power provided when a fuel cell is in a powering mode and a motor generator performs a powering operation.
Figure 5:
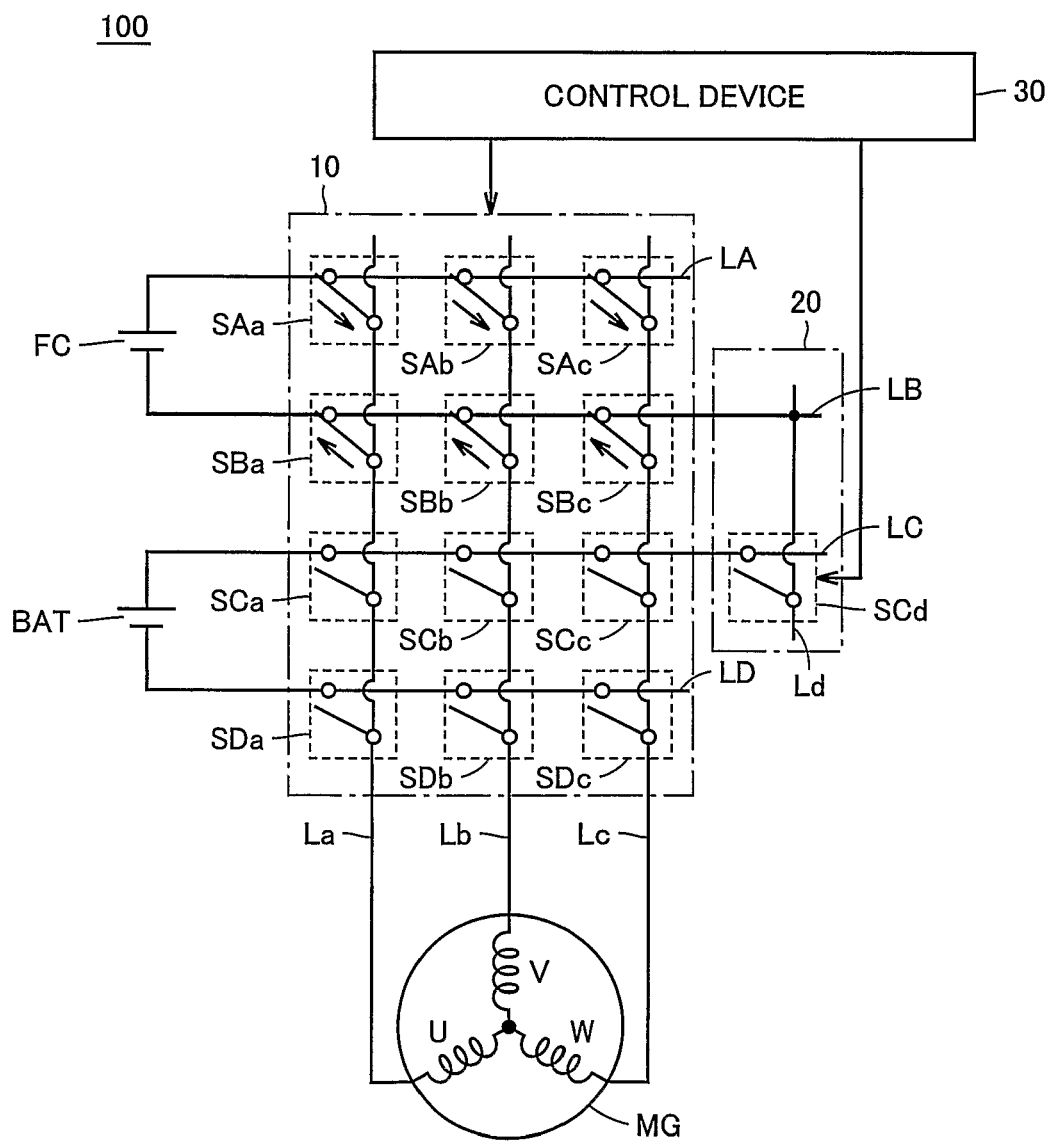
FIG. 5 is an electrical circuit diagram showing a flow of power for a power flow pattern P1 shown in FIG. 4.

FIG. 4 is a block diagram showing a flow of power provided when fuel cell FC is in the powering mode and motor generator MG performs the powering operation. FIG. 5 is an electrical circuit diagram showing a flow of power provided for power flow pattern P1 shown in FIG. 4.

With reference to FIGS. 4 and 5, control device 30 receives a motor torque command value, a value of a current of each phase of motor generator MG, and voltage output from fuel cell FC and battery BAT, and calculates voltage of each phase coil of motor generator MG. Control device 30 is driven by the calculated voltage of each phase of motor generator MG to generate and output a PWM signal to switches SAa-SAc, SBa-SBc.

Switches SAa-SAc, SBa-SBc operate in response to the PWM signal received from control device 30 to turn on/off to perform an inverter operation converting dc voltage output from fuel cell FC to ac voltage. DC voltage output from fuel cell FC is thus converted by power conversion portion 10 to ac power and output to motor generator MG.

Note that for power flow pattern P1 the other switches SCa-SCc, SDa-SDc, SCd are normally turned off.

Figure 6:
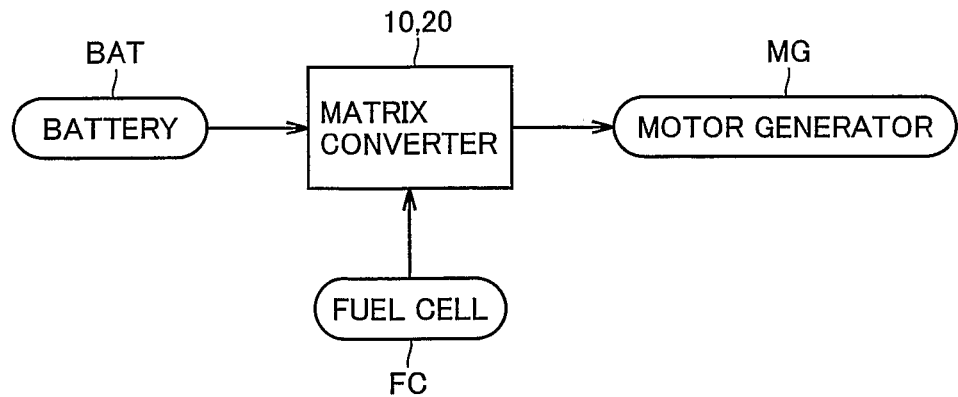
FIG. 6 is a block diagram showing a flow of power provided when the fuel cell and a battery are in the powering mode and the motor generator performs the powering operation.
Figure 7:
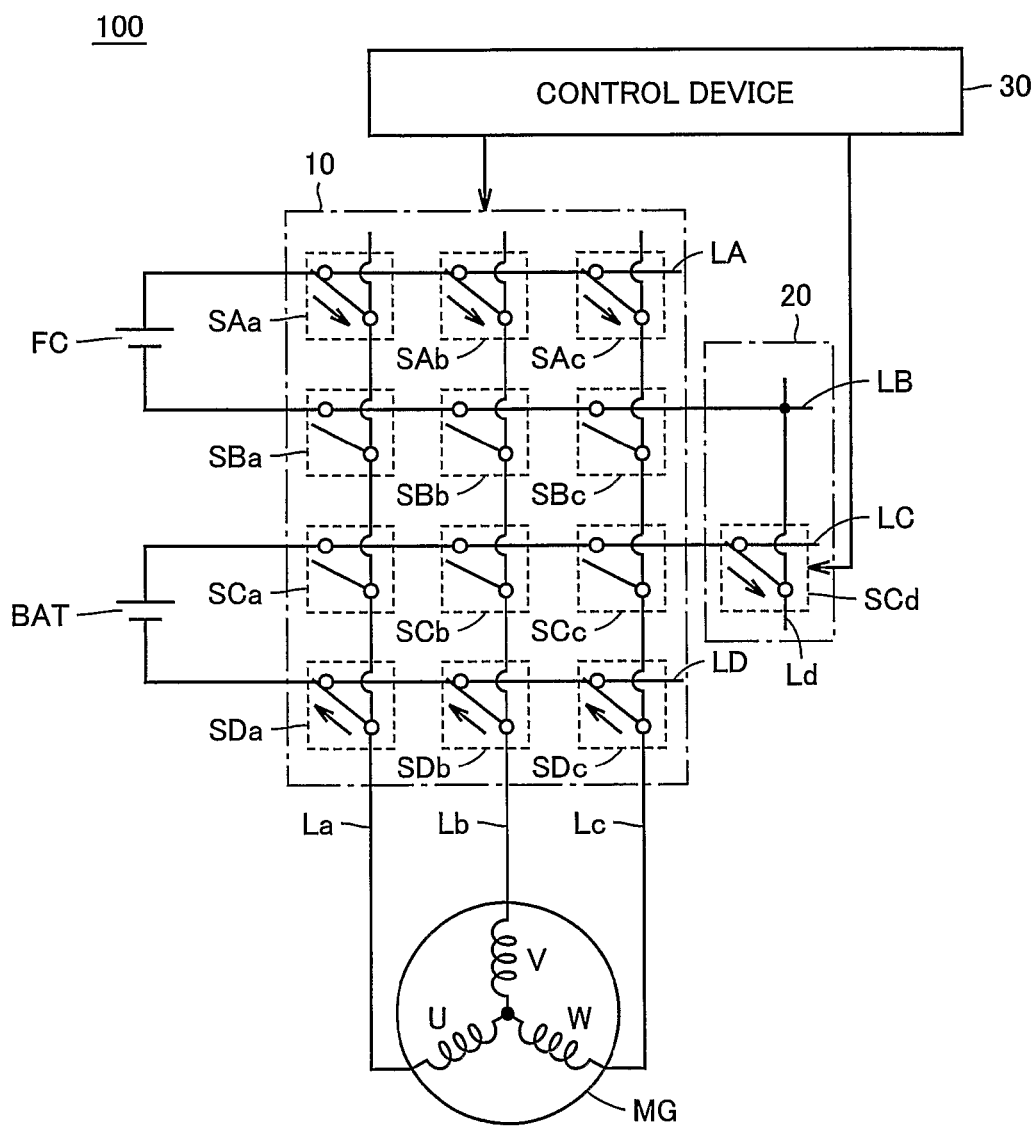
FIG. 7 is an electrical circuit diagram showing a flow of power for a power flow pattern P2 shown in FIG. 6.

FIG. 6 is a block diagram showing a flow of power provided when fuel cell FC and battery BAT in the powering mode and motor generator MG performs the powering operation, and FIG. 7 is an electrical circuit diagram showing a flow of power for power flow pattern P2 shown in FIG. 6.

With reference to FIGS. 6 and 7, control device 30 outputs a control signal to connection portion 20 to turn on switch SCd for connecting fuel cell FC and battery BAT in series for high voltage. Furthermore, control device 30 calculates voltage of each phase coil of motor generator MG, similarly as has done for power flow pattern P1, and is driven by the calculated voltage of each phase of motor generator MG to generate and output a PWM signal to switches SAa-SAc, SDa-SDc.

Switches SAa-SAc, SDa-SDc each operate in response to the PWM signal received from control device 30 to turn on/off to perform an inverter operation converting dc voltage output from fuel cell FC and battery BAT to ac voltage. DC power of high voltage output from fuel cell FC and battery BAT is thus converted by power conversion portion 10 to ac voltage and output to motor generator MG.

Note that for power flow pattern P2 the other switches SBa-SBc, SCa-SCc are normally turned off.

Figure 8:
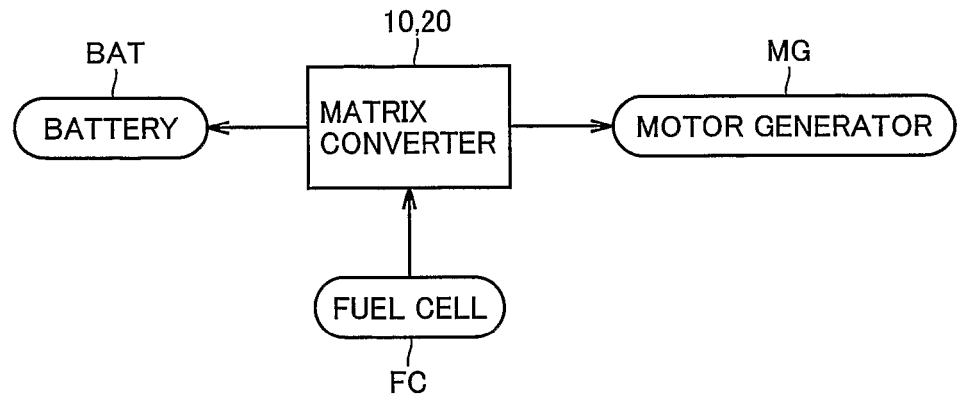
FIG. 8 is a block diagram showing a flow of power provided when the fuel cell is in the powering mode, the motor generator performs the powering operation, and the battery is in a regeneration mode.
Figure 9:
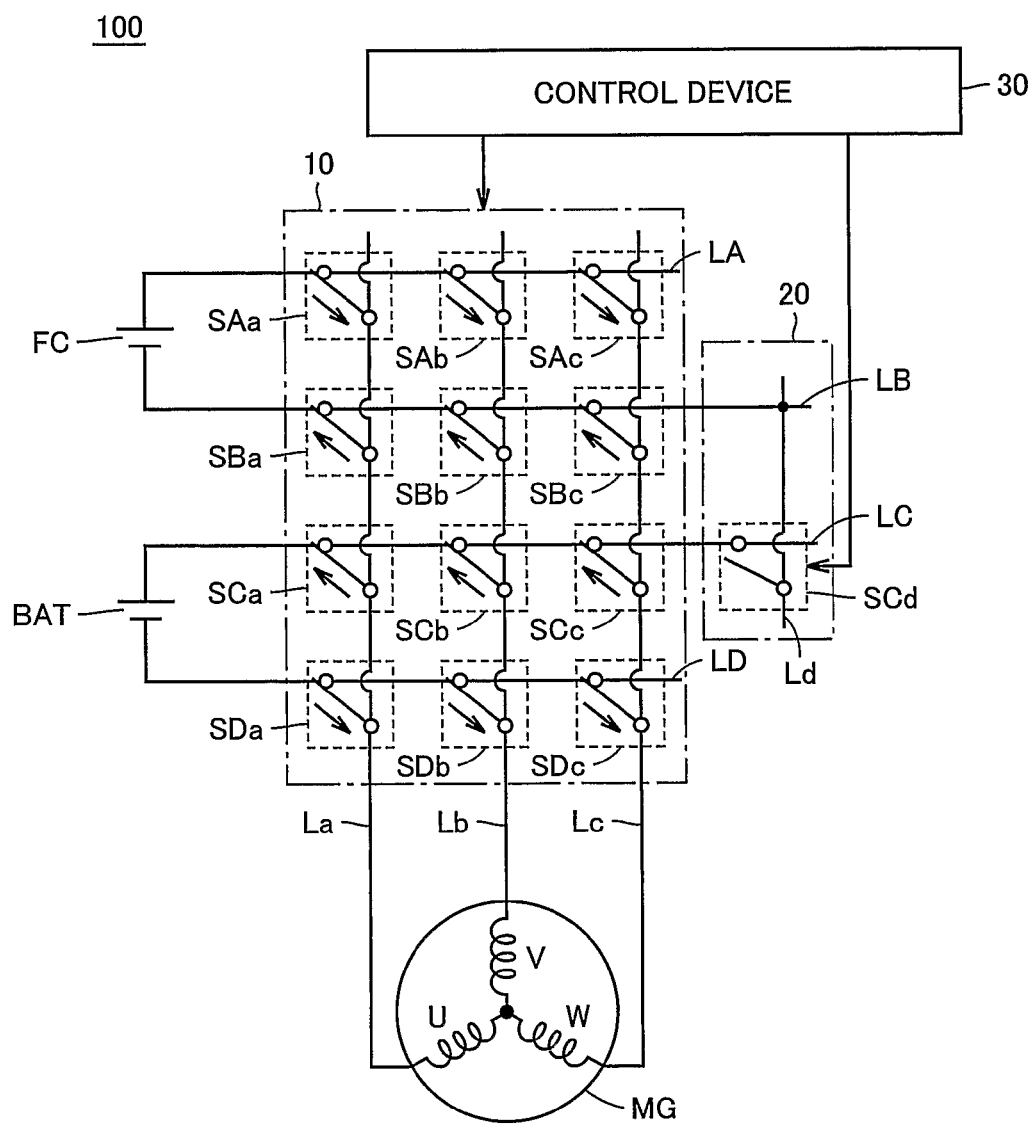
FIG. 9 is an electrical circuit diagram showing a flow of power for a power flow pattern P3 shown in FIG. 8.

FIG. 8 is a block diagram showing a flow of power provided when fuel cell SC is in the powering mode, motor generator MG performs the powering operation and battery BAT is in a regeneration mode, and FIG. 9 is an electrical circuit diagram showing a flow of power for power flow pattern P3 shown in FIG. 8.

With reference to FIGS. 8 and 9, control device 30 calculates voltage of each phase coil of motor generator MG, as has been done for power flow pattern P1, and is driven by the calculated voltage of each phase of motor generator MG to generate and output a PWM signal to switches SAa-SAc, SBa-SBc.

Furthermore, control device 30 is driven by inter-terminal voltage of fuel cell FC and battery BAT detected to generate a control signal for supplying power from fuel cell FC to battery BAT and output the generated control signal to switches SCa-SCc, SDa-SDc.

Switches SAa-SAc, SBa-SBc each operate in response to the PWM signal received from control device 30 to turn off/on to perform an inverter operation converting dc voltage output from fuel cell FC to ac voltage. Switches SCa-SCc, SDa-SDc each operate in response to the control signal received from control device 30 to turn on/off to rectify a portion of drive currents on power supply lines La-Lc ac-converted by switches SAa-SAc, SBa-SBc and output the same to battery BAT. DC power output from fuel cell FC is thus converted by power conversion portion 10 to ac power which is output to motor generator MG and also used to simultaneously charge battery BAT.

Note that for power flow pattern P3 switch SCd is normally turned off.

Figure 10:
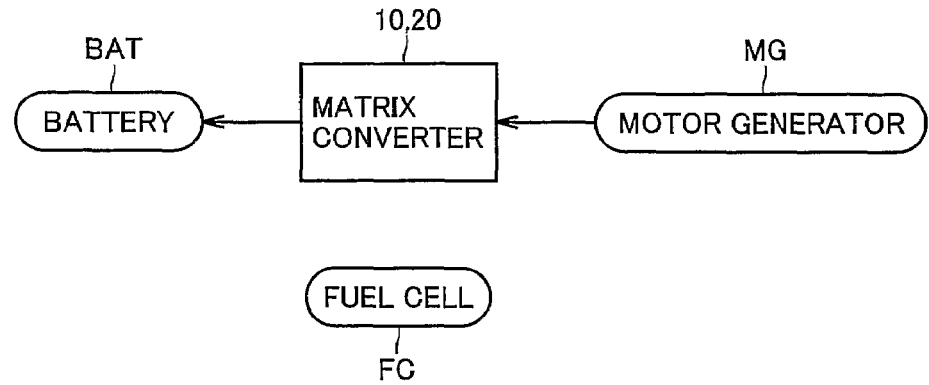
FIG. 10 is a block diagram showing a flow of power provided when the motor generator regeneratively operates and the battery is in the regeneration mode.
Figure 11:
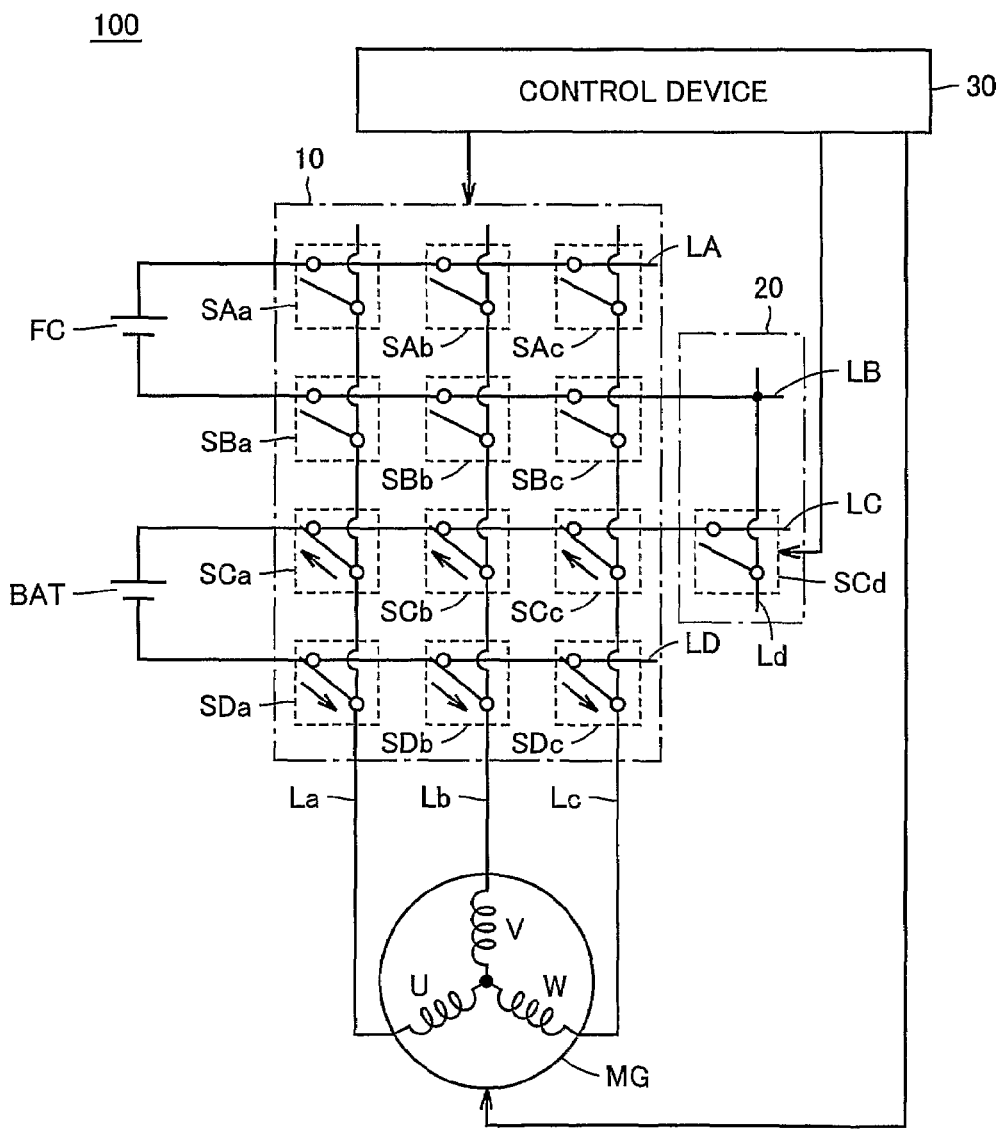
FIG. 11 is an electrical circuit diagram showing a flow of power for a power flow pattern P4 shown in FIG. 10.

FIG. 10 is a block diagram showing a flow of power provided when motor generator MG regeneratively operates and battery BAT is in the regeneration mode, and FIG. 11 is an electrical circuit diagram showing a flow of power provided for power flow pattern P4 shown in FIG. 10.

With reference to FIGS. 10 and 11, control device 30 is driven by voltage of each phase of motor generator MG detected and the battery BAT inter-terminal voltage BAT detected to generate a control signal for supplying power from motor generator MG to battery BAT and output the generated control signal to switches SCa-SCc, SDa-SDc.

Switches SCa-SCc, SDa-SDc each operate in response to the control signal received from control device 30 to turn on/off to rectify ac power output from motor generator MG on power supply lines La-Lc and output the same to battery BAT. Power regenerated by motor generator MG thus charges battery BAT.

Note that as has been described previously, normal controlling regeneration requires that electromotive voltage Vmg generated at motor generator MG have a maximum value smaller than the battery BAT inter-terminal voltage Vbat. Accordingly, when electromotive voltage Vmg has a maximum value equal to or larger than inter-terminal voltage Vbat, control device 30 outputs a braking command to motor generator MG to brake motor generator MG by mechanical braking, and when the electromotive voltage Vmg maximum value is reduced to be smaller than inter-terminal voltage Vbat, control device 30 controls regeneration.

Note that for power flow pattern P4 switches SAa-SAc, SBa-SBc, SCd are normally turned off.

Figure 12:
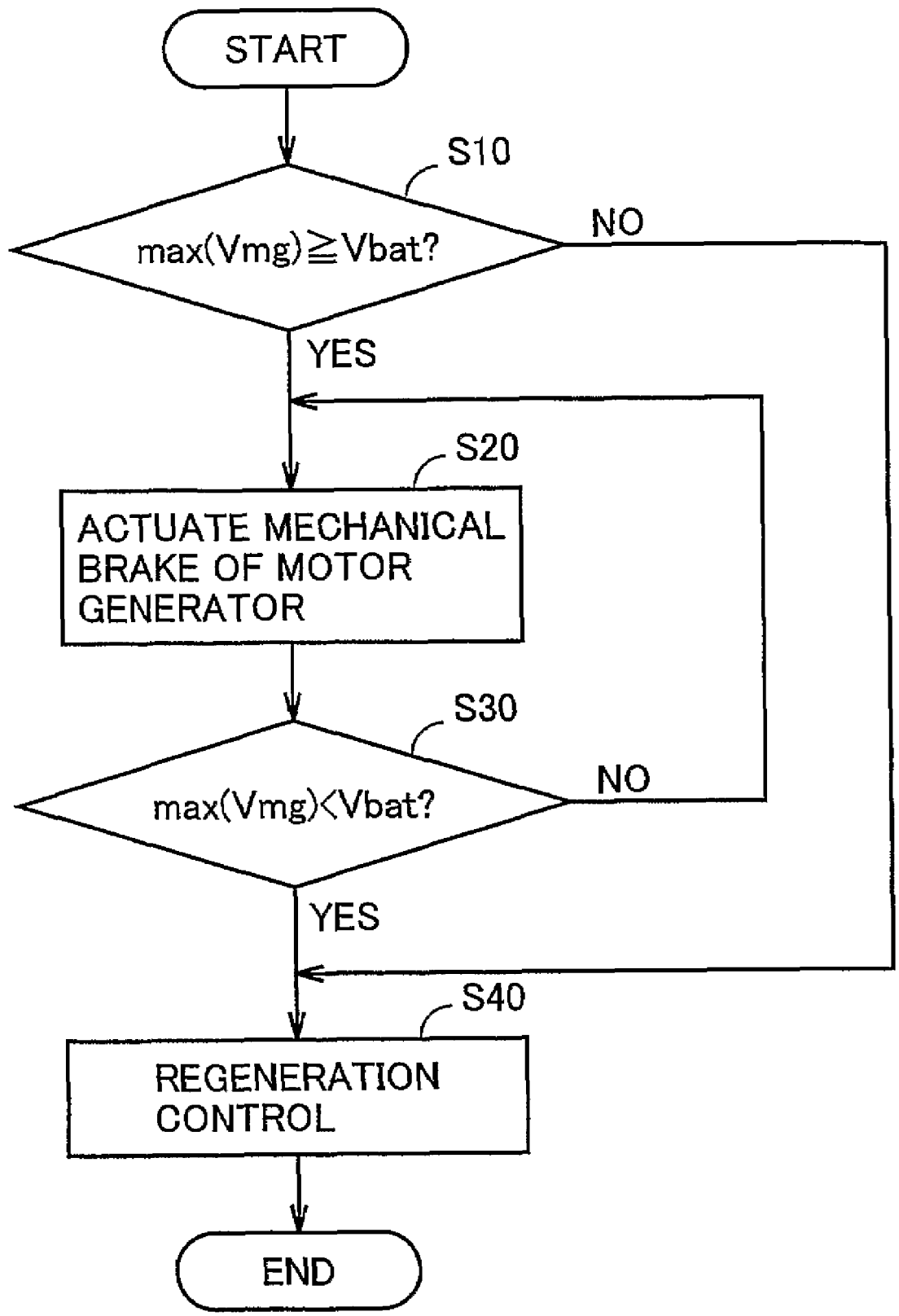
FIG. 12 is a flow chart illustrating control exerted for the regeneration operation shown in FIGS. 10 and 11.

FIG. 12 is a flow chart for control for the FIGS. 10 and 11 regeneration operation.

With reference to the figure, for the FIGS. 10 and 11 power flow pattern P4, control device 30 determines whether the motor generator MG electromotive voltage Vmg has a maximum voltage max (Vmg) equal to or larger than the battery BAT inter-terminal voltage Vbat (step S10). If voltage max (Vmg) is smaller than voltage Vbat, control device 30 controls regeneration to convert ac power generated by motor generator MG to dc power and charge battery BAT therewith (step S40).

If at step S10 control device 30 determines that voltage max (Vmg) is equal to or larger than voltage Vbat, control device 30 outputs a braking command to motor generator MG to reduce the motor generator MG's rotation rate. Motor generator MG receives the command and responsively actuates a mechanical brake to reduce its rotation rate (step S20).

When the motor generator MG rotation rate is reduced, electromotive voltage Vmg generated at motor generator MG decreases. Control device 30 determines whether electromotive voltage Vmg has maximum voltage max (Vmg) smaller than inter-terminal voltage Vbat (step S30) and if so control device 30 controls regeneration (step S40).

If voltage max (Vmg) is still equal to or larger than interterminal voltage Vbat, it is necessary to further reduce the motor generator MG rotation rate, and control device 30 returns to step S20.

Figure 13:
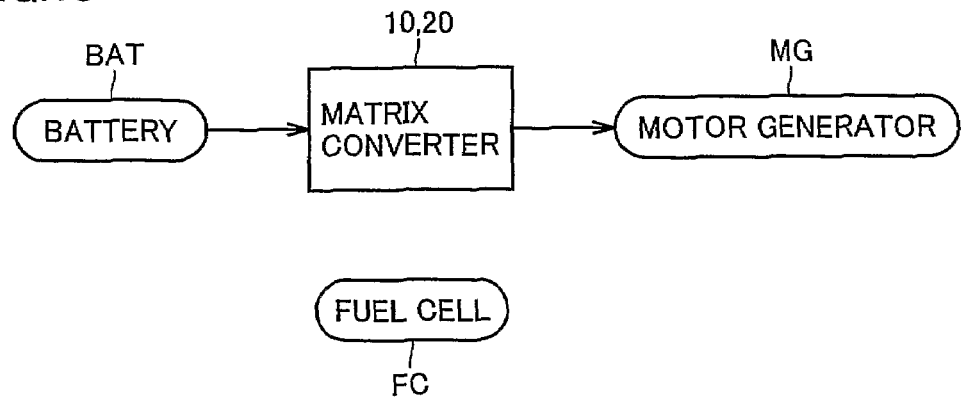
FIG. 13 is a block diagram showing a flow of power provided when the battery is in the powering mode and the motor generator performs the powering operation.
Figure 14:
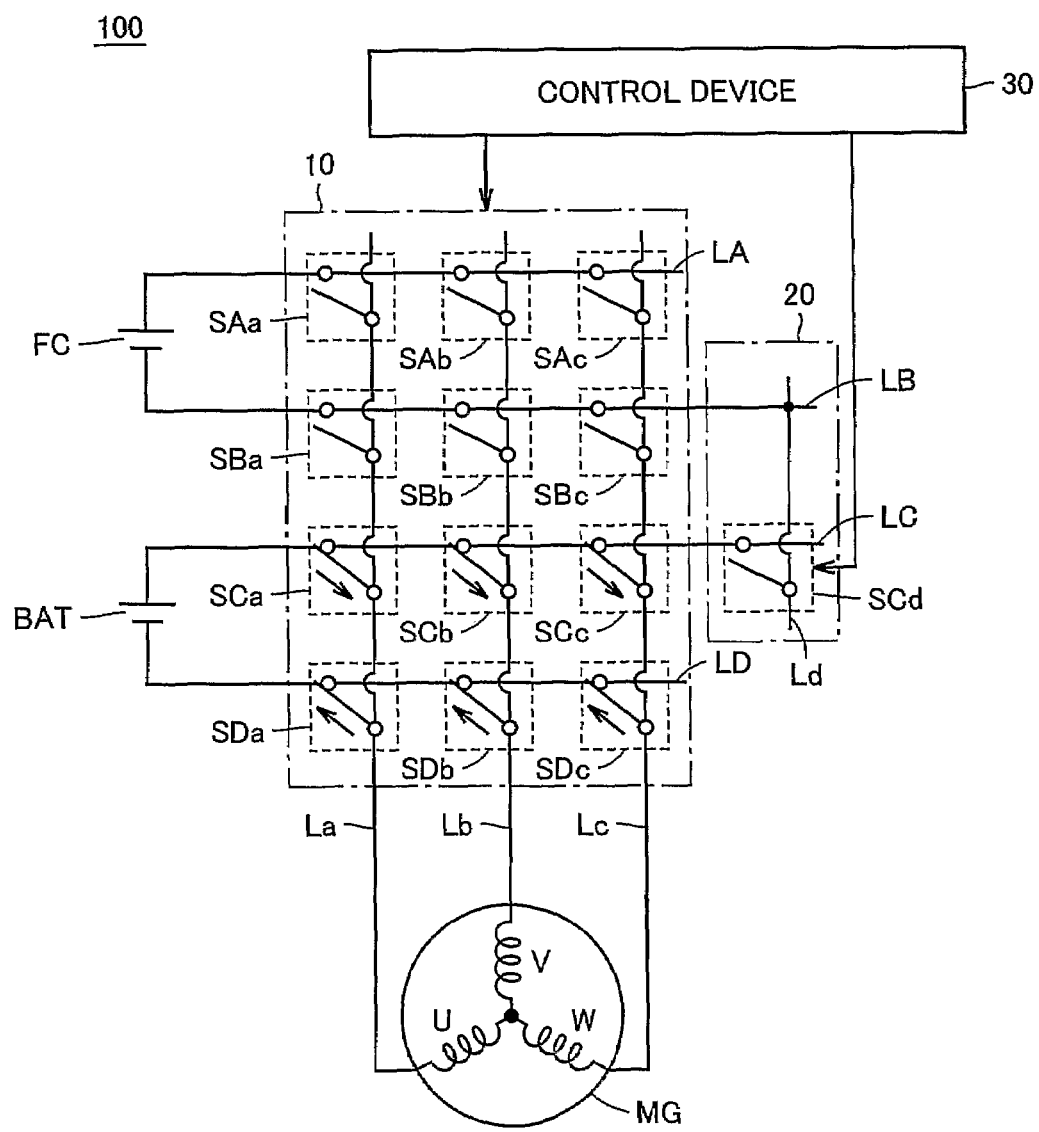
FIG. 14 is an electrical circuit diagram showing a flow of power for a power flow pattern P5 shown in FIG. 13.

FIG. 13 is a block diagram showing a flow of power provided when battery BAT in the powering mode and motor generator MG performs the powering operation, and FIG. 14 is an electrical circuit diagram showing a flow of power for power flow pattern P5 shown in FIG. 13.

With reference to FIGS. 13 and 14, control device 30 calculates voltage of each phase coil of motor generator MG, as has been done for power flow pattern P1, and is driven by the calculated voltage of each phase of motor generator MG to generate and output a PWM signal to switches SCa-SCc, SDa-SDc.

Switches SCa-SCc, SDa-SDc each operate in response to the PWM signal received from control device 30 to turn on/off to perform an inverter operation converting dc voltage output from battery BAT to ac voltage. DC power output from battery BAT is thus converted by power conversion portion 10 to ac power and output to motor generator MG.

Note that for power flow pattern P5 the other switches SAa-SAc, SBa-SBc, SCd are normally turned off. More specifically, for power flow pattern P5, fuel cell FC's output is stopped and battery BAT's output alone drives motor generator MG. The operation by power flow pattern P5 is also referred to as "intermittent operation".

Figure 15:
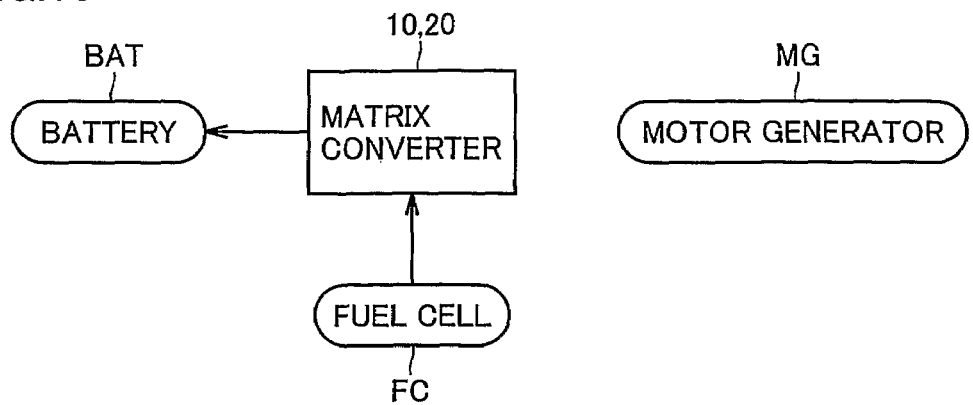
FIG. 15 is a block diagram showing a flow of power provided when the fuel cell is in the powering mode and the battery is in the regeneration mode.
Figure 16:
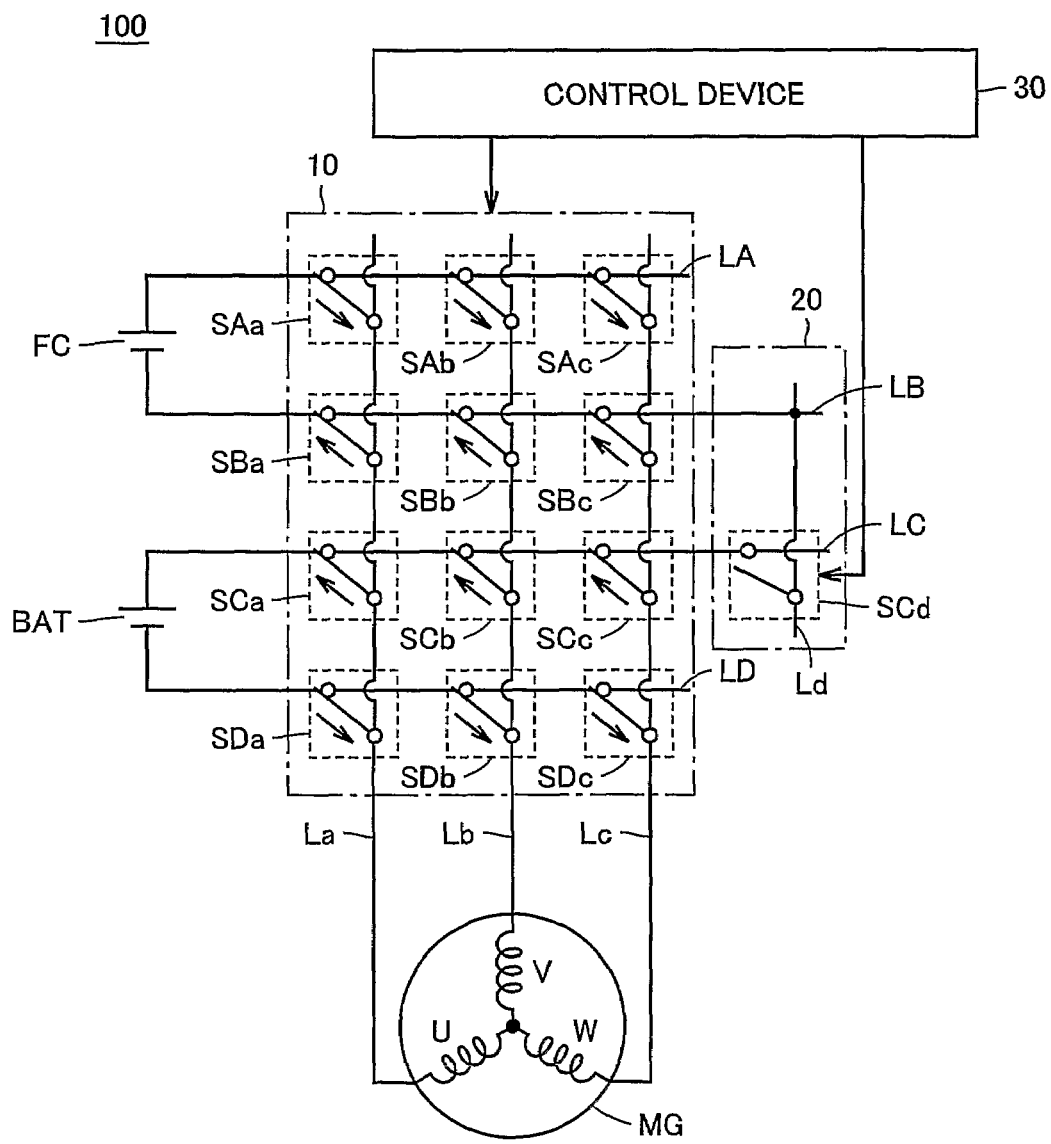
FIG. 16 is an electrical circuit diagram showing a flow of power for a power flow pattern P6 shown in FIG. 15.

FIG. 15 is a block diagram showing a flow of power provided when fuel cell FC is in the powering mode and battery BAT is in the regeneration mode, and FIG. 16 is an electrical circuit diagram showing a flow of power for power flow pattern P6 shown in FIG. 15.

With reference to FIGS. 15 and 16, control device 30 generates a PWM signal turning on/off switches SAa-SAc, SBa-SBc and outputs the generated PWM signal to the switches. More specifically, control device 30 detects a rotation angle θ of motor generator MG by a rotation position sensor (not shown) for motor generator MG and generates a PWM signal so as to provide a voltage pattern providing motor generator MG with a q axis current of 0. Such PWM signal is generated because power flow pattern P6 is provided to compulsorily, directly charge battery BAT by fuel cell FC in response to a reduced state of charge (SOC) of battery BAT and accordingly prevent power flowing from fuel cell FC to motor generator MG.

Furthermore control device 30 outputs a control signal to switches SCa-SCc, SDa-SDc so that the switches switch in synchronization with switches SAa-SAc, SBa-SBc, respectively.

Switches SAa-SAc, SBa-SBc each operate in response to the control signal received from control device 30 to turn on/off to perform an inverter operation converting dc voltage output from fuel cell FC to ac voltage. Switches SCa-SCc, SDa-SDc each operate in response to the control signal received from control device 30 to turn on/off in synchronization with switches SAa-SAc, SBa-SBc, respectively, to rectify current ac-converted by switches SAa-SAc, SBa-SBc and output the rectified current to battery BAT.

This allows battery BAT to be directly charged by fuel cell FC without causing a power flow from fuel cell FC to motor generator MG.

Note that for power flow pattern P6 switch SCd is normally turned off.

Note that in the FIG. 1 fuel cell vehicle 100 capacitors may be provided between power supply lines LA and LB and between power supply lines LC and LD, respectively, to smooth voltage of dc power supply line. This can reduce an effect on each equipment of a ripple attributed to a switching operation in power conversion portion 10.

Furthermore while in the above description the dc power supply is fuel cell FC and battery BAT, it is not limited thereto in type and number and a different, well-known dc power supply may be used and three or more dc power supplies may also be provided.

Furthermore while in the above description the ac machine is motor generator MG incremented by a 3-phase ac synchronous motor generator, it is not limited thereto and may be a 3-phase ac induction motor generator, an n-phase ac machine or the like.

Furthermore while in the above description six power flow patterns P1-P6 exist for fuel cell vehicle 100, they are not limited thereto and in accordance with the above described power conversion device a variety of power flow patterns can be configured.

Thus in the first embodiment a dc power supply or fuel cell FC and battery BAT and an ac machine or motor generator MG have a matrix converter connected thereto, and the matrix converter includes power conversion portion 10 converting power between fuel cell FC, battery BAT and motor generator MG, and connection portion 20 capable of connecting fuel cell FC and battery BAT in series so that in accordance with a power flow pattern of fuel cell vehicle 100 a circuit configuration is dynamically converted between fuel cell FC, battery BAT and motor generator MG by connection portion 20 and in addition thereto power conversion portion 10 converts power between fuel cell FC, battery BAT and motor generator MG.

Thus in accordance with the above described each power flow pattern a variety of power communications can be achieved between fuel cell FC, battery BAT and motor generator MG, and any ac voltage can be generated within a range of maximum dc voltage provided when fuel cell FC and battery BAT are connected in series, and the ac voltage can be supplied to motor generator MG. Furthermore, the present power conversion device can dispense with a reactor, a capacitor and the like that conventional power conversion devices are equipped with. Fuel cell vehicle 100 can be reduced in size and free of noise attributed to the reactor so that the vehicle can be improved in quietness.

Furthermore in the first embodiment in the regeneration operation a mechanical brake is employed to reduce the motor generator MG rotation rate to prevent the motor generator MG electromotive voltage Vmg from attaining and exceeding the battery BAT inter-terminal voltage Vbat and thus ensure communication of regeneration from motor generator MG to battery BAT.

Furthermore in the first embodiment switches SAa-SAc, SBa-SBc connected to power supply lines LA, LB connected to fuel cell FC incapable of regeneration from a power supply line, are monodirectional switches, and a power element passing a current in an unwanted direction can be eliminated. A power conversion device configured of an excess and deficiency-free, appropriate switching configuration, can be achieved.

Furthermore in the first embodiment when power flow pattern P6 is applied to supply power from fuel cell FC to battery BAT a voltage pattern is generated such that a q axis current for motor generator MG is 0. In motor generator MG no rotation torque is generated and fuel cell vehicle 100 sufficiently considering safety can be provided.

Second Embodiment

A second embodiment differs from the first embodiment in a control operation performed for power flow pattern P4 for which motor generator MG performs a regeneration operation.

With reference again to FIG. 1, the second embodiment provides a fuel cell vehicle 100A corresponding to the first embodiment's fuel cell battery 100 having control device 30 replaced with a control device 30A. Note that in fuel cell vehicles 100A control device 30A does not issue a braking command to motor generator MG. The remainder in configuration of fuel cell vehicle 100A is identical to that of fuel cell vehicle 100.

For the regeneration operation or power flow pattern P4 control device 30A outputs a control signal to connection portion 20 to electrically disconnect power supply line LC from power supply line LB and outputs a control signal to power conversion portion 10 to rectify ac power generated by motor generator MG to dc power and also up convert electromotive voltage Vmg generated at motor generator MG to the battery BAT inter-terminal voltage Vbat.

Note that, as has been described previously, normally controlling regeneration in the regenerative operation requires that electromotive voltage Vmg generated at motor generator MG have a maximum value smaller than the battery BAT inter-terminal voltage Vbat. Accordingly when electromotive voltage Vmg has a maximum value equal to or larger than inter-terminal voltage Vbat, control device 30A employs a current output from fuel cell FC to control a magnetic field of motor generator MG to weaken the same.

More specifically, control device 30A controls switches SAa-SAc, SBa-SBc connected to power supply lines LA, LB connected to fuel cell FC to switch to output to motor generator MG a d axis current for weakening the magnetic field of motor generator MG. When the magnetic field of motor generator MG is weakened, electromotive voltage Vmg generated at motor generator MG decreases, and control device 30A controls switches SCa-SCc, SDa-SDc connected to power supply lines LC, LD connected to battery BAT to switch to perform the regeneration operation of motor generator MG.

Note that control device 30A for other than power flow pattern P4 provides the same control operation as control device 30.

Figure 17:
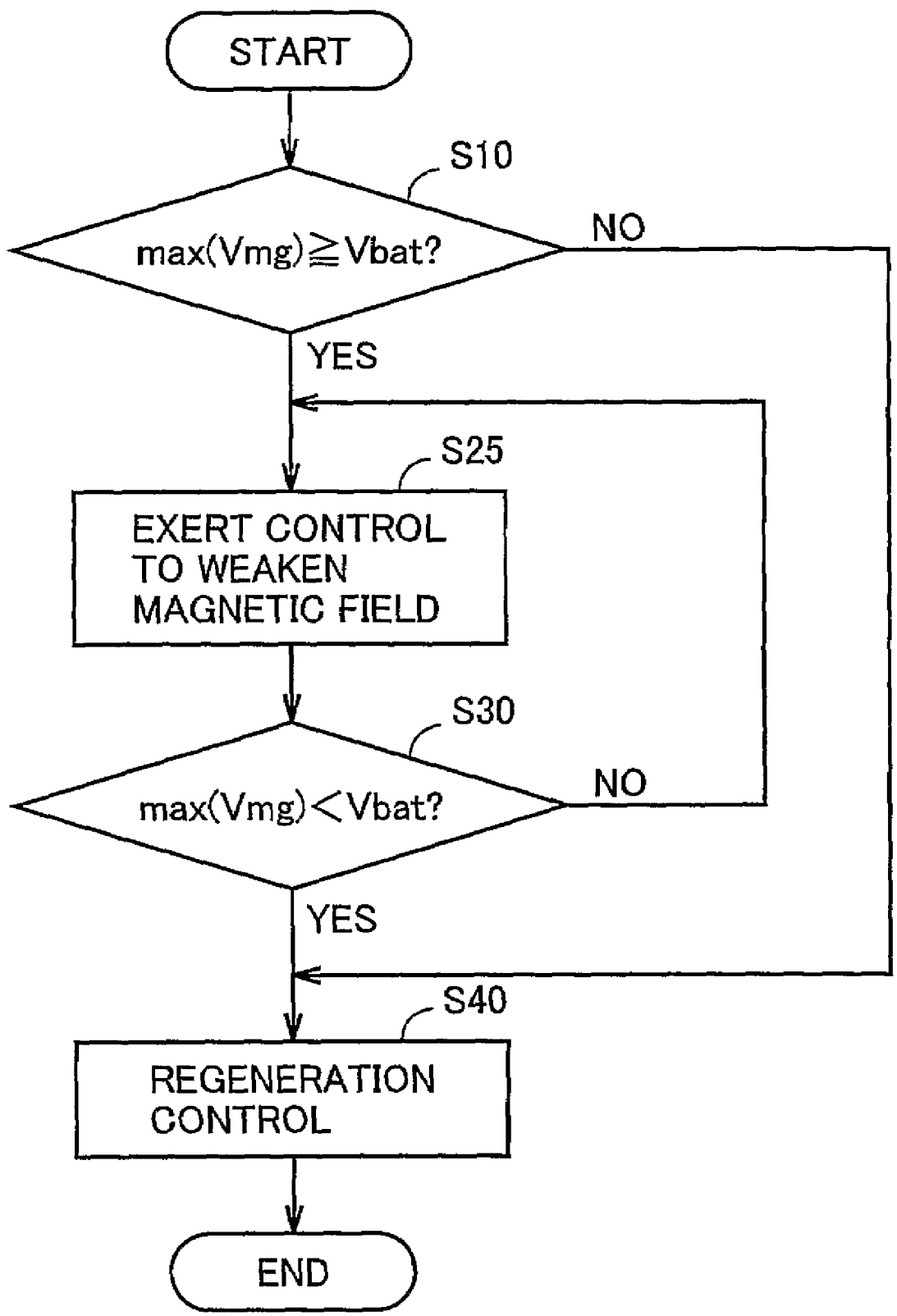
FIG. 17 is a flow chart illustrating control exerted for a regeneration operation in a second embodiment.

FIG. 17 is a flow chart for control exerted for the regeneration operation in the second embodiment.

With reference to the figure, this flow corresponds to that for the regeneration operation in the first embodiment as shown in FIG. 12 having step S20 replaced with step S25.

If at step S10 control device 30A determines that voltage max (Vmg) is equal to or larger than voltage Vbat control device 30A controls switches SAa-SAc, SBa-SBc to switch and employs fuel cell FC to weaken a magnetic field of motor generator MG (step S25). When the motor generator MG magnetic field is weakened, electromotive voltage Vmg generated at motor generator MG decreases, and control device 30A goes to step S30.

Second Embodiment in Exemplary Variation

In the second embodiment in the regenerative operation fuel cell FC is employed as a dc power supply and a d axis current is employed to control a magnetic field to weaken it. In the second embodiment in an exemplary variation when the d axis current is employed to control a magnetic field to weaken it connection portion 20 connects fuel cell FC and battery BAT in series to contemplate high voltage of a power supply in the d axis current control. This allows the d axis current control, i.e., controlling a magnetic field to weaken it, to be highly responsive.

Figure 18:
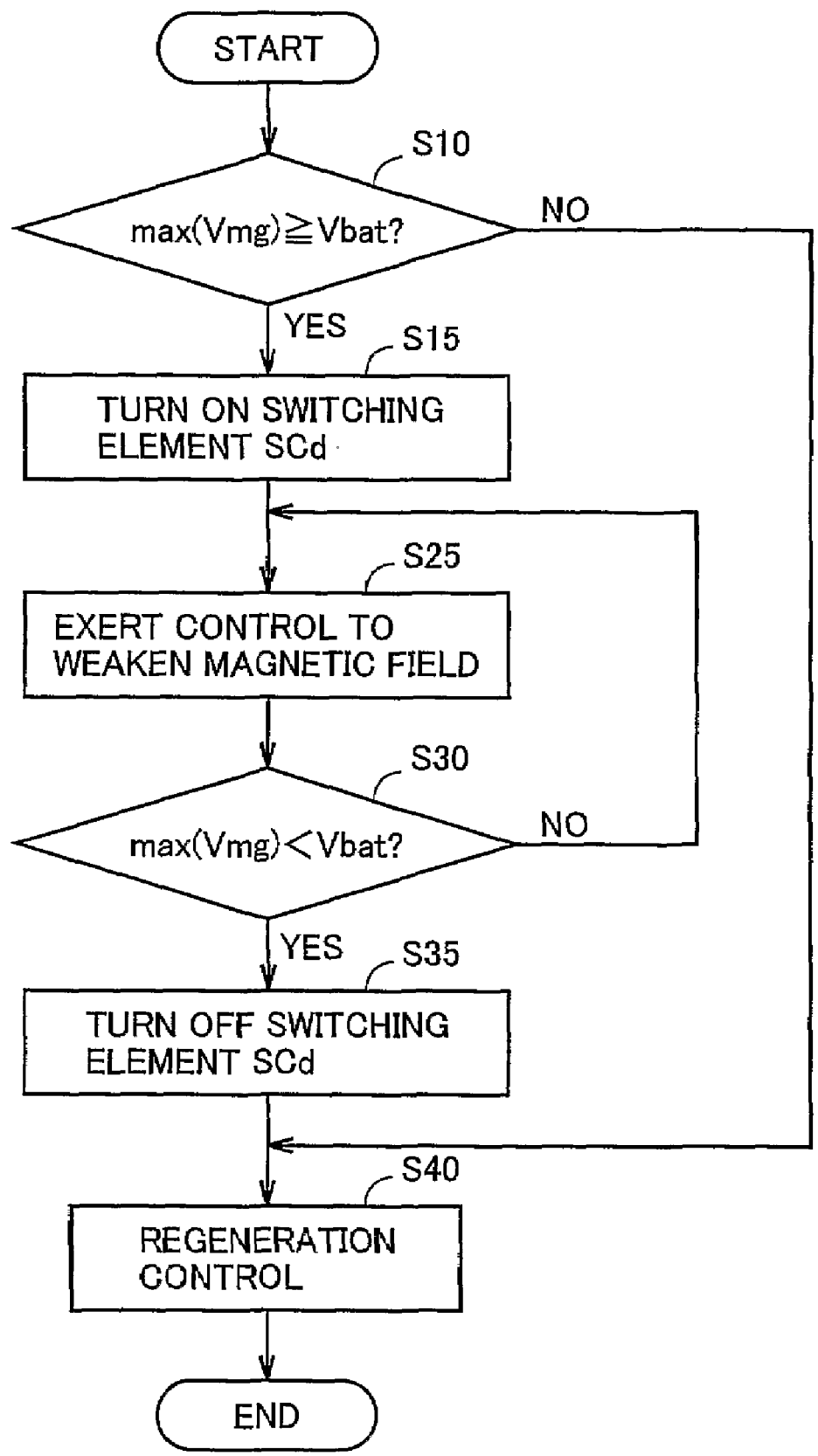
FIG. 18 is a flow chart illustrating control exerted for a regeneration operation in an exemplary variation of the second embodiment.

FIG. 18 is a flow chart for control exerted for a regeneration operation in the second embodiment in the exemplary variation.

With reference to the figure, this flow corresponds to that for the regeneration operation in the second embodiment shown in FIG. 17 plus steps S15 and S35.

If at step S10 control device 30A determine that voltage max (Vmg) is equal to or larger than voltage Vbat control device 30A turns on switch SCd of connection portion 20 (step S15). When switch SCd is turned on and fuel cell FC and battery BAT are connected in series control device 30A controls switches SAa-SAc, SDa-SDc to switch and employs fuel cell FC and battery BAT to control and thus weaken the magnetic field of motor generator MG (step S25).

Furthermore if at step S30 control device 30A determines that voltage max (Vmg) is smaller than inter-terminal voltage Vbat control device 30A turns off switch SCd of connection portion 20 (step S35), and controls switches SCa-SCc, SDa-SDc to switch to control regeneration of motor generator MG (step S40).

Thus in the second embodiment and an exemplary variation thereof in the regeneration operation a magnetic field of motor generator MG is controlled to be weak to prevent the motor generator MG electromotive voltage Vmg from attaining or exceeding the battery BAT inter-terminal voltage Vbat and thus ensure communication of regeneration from motor generator MG to battery BAT.

Furthermore in the second embodiment's exemplary variation in the regeneration operation when a magnetic field is controlled to be weak connection portion 20 has switch SCd turned on to provide high voltage of a dc power supply in the d axis current control. The d axis current control can be enhanced in responsiveness and as a result the regeneration operation can be highly responsive.

Third Embodiment

The first and second embodiments provide a power conversion device having a dc power supply implemented by two dc power supplies i.e., fuel cell FC and battery BAT, and fuel cell FC is not provided with regeneration (or charged) from a power supply line. The third embodiment provides a more generalized power conversion device.

Figure 19:
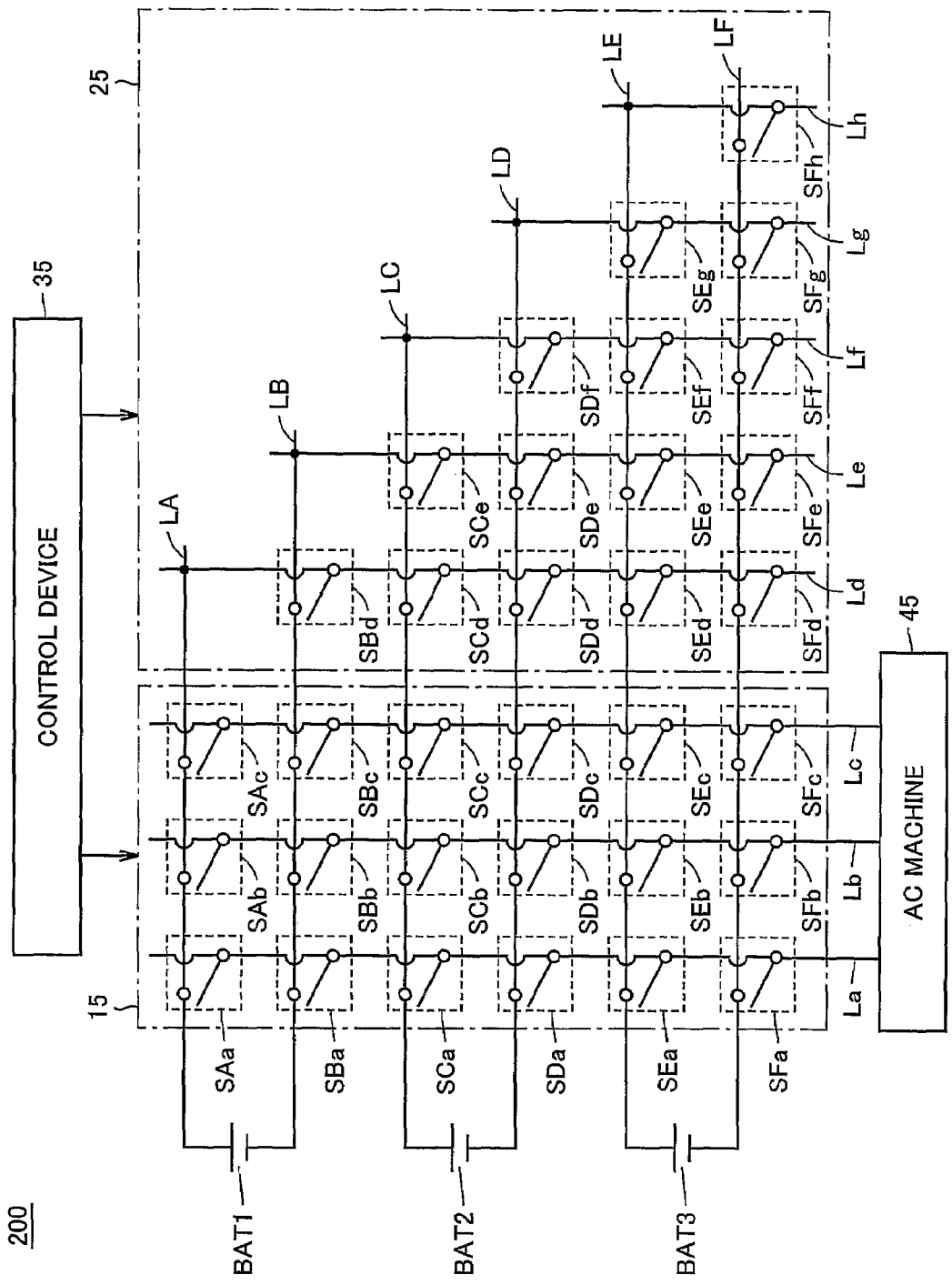
FIG. 19 is an electrical circuit diagram showing a configuration of the present power conversion device in a third embodiment.

FIG. 19 is an electrical circuit diagram showing a arrangement of the present power conversion device in the third embodiment. While FIG. 19 representatively shows a power conversion device converting power between three rechargeable and dischargeable dc power supplies and a 3-phase ac machine, the third embodiment provides a generalized power conversion device that is not limited thereto and can be readily extended to a power conversion device converting power between m rechargeable an dischargeable dc power supplies and an n-phase ac machine, wherein m and n are natural numbers equal to or larger than two.

With reference to FIG. 19, a power conversion device 200 includes a power conversion portion 15, a connection portion 25 and a control device 35. Power conversion portion 15 is connected to batteries BAT1-BAT3 and a 3-phase ac machine 45.

Batteries BAT1-BAT3 are rechargeable and dischargeable secondary batteries, and supply dc power to power conversion portion 15 and are charged with dc power received from power conversion portion 15. 3-phase ac machine 45 receives ac power from power conversion portion 15 to perform a powering operation, and regeneratively operates to regenerate and supply energy to power version portion 15.

Power conversion portion 15 converts and communicates power between batteries BAT1-BAT3 and 3-phase ac machine 45. Furthermore, when connection portion 25, which will be described hereinafter, connects any two or all of batteries BAT1-BAT3 in series, power conversion portion 15 converts dc power of high voltage output from the series connected batteries to ac power and outputs the ac power to 3-phase ac machine 45.

Connection portion 25 connects any two or all of batteries BAT1-BAT3 in series by operating in response to a control signal received from control device 35 to selectively connect power supply lines LA-LF connected to positive and negative electrodes of batteries BAT1-BAT3.

Control device 35 operates in accordance with a power conversion pattern to control power conversion portion 15 to allow desired power conversion between batteries BAT1-BAT3 and 3-phase ac machine 45. Furthermore, control device 35 operates in accordance with a power conversion pattern to control connection portion 25 to connect any two or all of batteries BAT1-BAT3 in series.

Power conversion portion 15 and connection portion 25 are configured of a matrix converter. Power conversion portion 15 includes switches SAa-SFa, SAb-SFb, SAc-SFc and power supply lines LA-LF, La-Lc. Connection portion 25 includes switches SBd-SFd, SCe-SFe, SDf-SFf, SEg, SFg, SFh and power supply lines Ld-Lh.

Power supply lines LA, LB are connected to battery BAT1 at positive and negative electrodes, respectively. Power supply lines LC, LD are connected to battery BAT2 at positive and negative electrodes, respectively. Power supply lines LE, LF are connected to battery BAT3 at positive and negative electrodes, respectively. Power supply lines La-Lc are connected to 3-phase ac machine 45 at phase terminals, respectively, and power supply lines Ld-Lh are connected to power supply lines LA-LF, respectively.

Note that in the above description power supply lines LA-LF correspond to a "first power supply line" and power supply lines LA-LC correspond to a "second power supply line".

Power conversion portion 15 and connection portion 25 have each switch configured of the bi-directional switch shown in FIG. 2 or 3 and are operable in response to a control signal received from control device 35 to pass a current having a direction depending on a difference in potential between two power supply lines having each switch connected thereto.

Connection portion 25 shown in FIG. 19 has one of the most general circuit configurations. More specifically, connection portion 25 has a circuit configuration having switches arranged in a lower triangular matrix. Such arrangement allows batteries BAT1-BAT3 to be connected in any order and direction.

If m dc power supplies are used and connection portion 25 has switches arranged in the above described lower triangular matrix, it requires a number N1 of switches, as represented by the following equation:

$$N1 = \sum_{k=1}^{2m-1} k = (2m-1)m. \tag{1}$$

Third Embodiment in First Exemplary Variation

Figure 20:
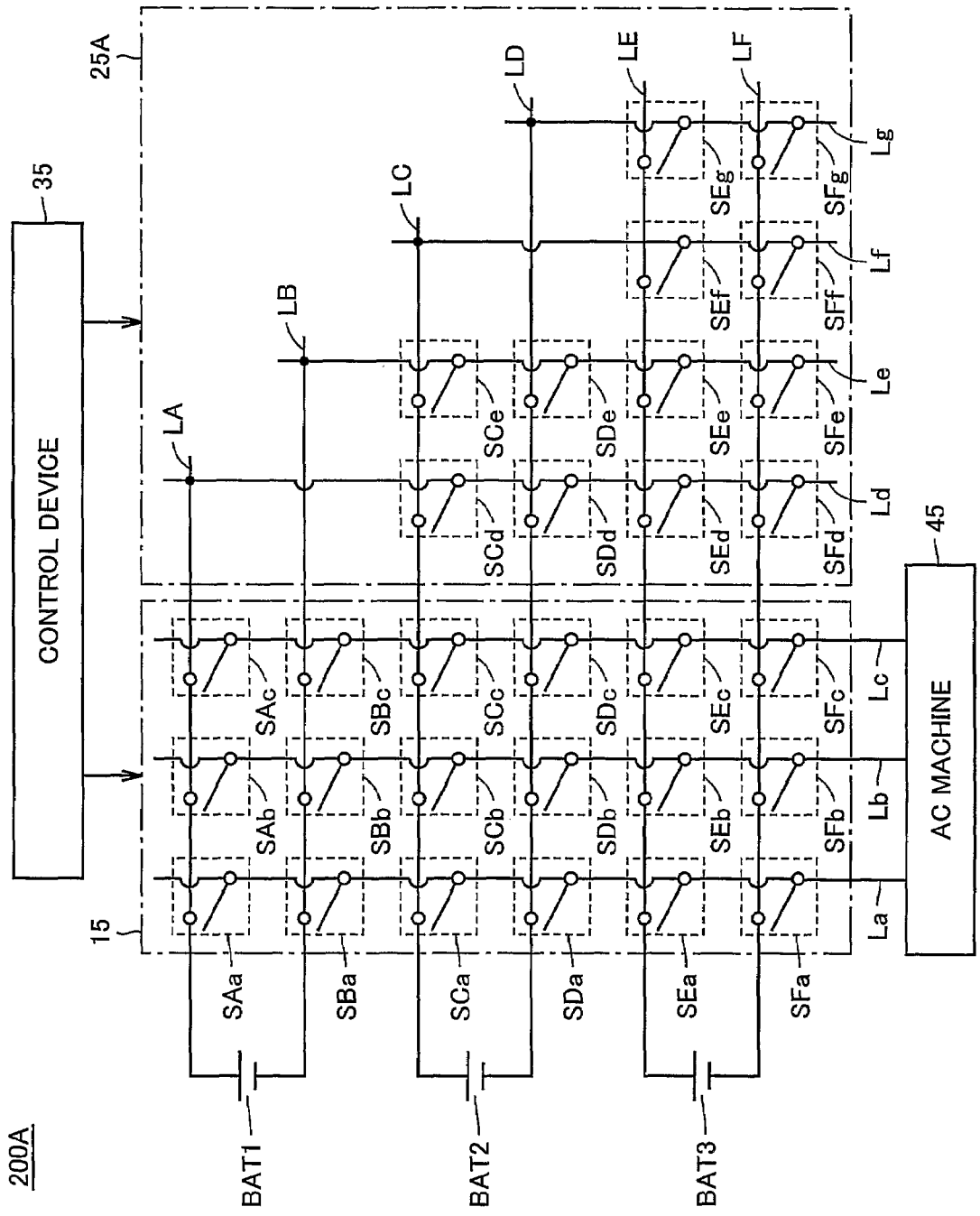
FIGS. 20 and 21 are electrical circuit diagrams showing configurations of the present power conversion device of the third embodiment in exemplary first and second variations, respectively.

FIG. 20 is an electrical circuit diagram showing a arrangement of the present power conversion device of the third embodiment in a first exemplary variation.

With reference to the figure, a power conversion device 200A corresponds to the FIG. 19 power conversion device 200 having connection portion 25 replaced with a connection portion 25A corresponding to connection portion 25 minus switches SBd, SDf, SFh and power supply line Lh.

More specifically, while connection portion 25A serves to connect batteries BAT1-BAT3 in series by selecting and electrically connecting power supply lines LA-LF, there can be no such form of connection between power supply lines as short circuiting the positive and negative electrodes of each battery BAT1-BAT3, and accordingly connection portion 25 has eliminated therefrom switch SBd provided for connecting power supply lines LA and LB, switch SDf provided for connecting power supply lines LC and LD, and switch SFh provided for connecting power supply lines LE and LF.

If m dc power supplies are employed and power conversion device 200A is generalized, connection portion 25A has a number N2 of switches, as represented by the following equation:

$$N2 = N1 - m = 2(m-1)m \qquad (2).$$

Third Embodiment in Second Exemplary Variation

Figure 21:
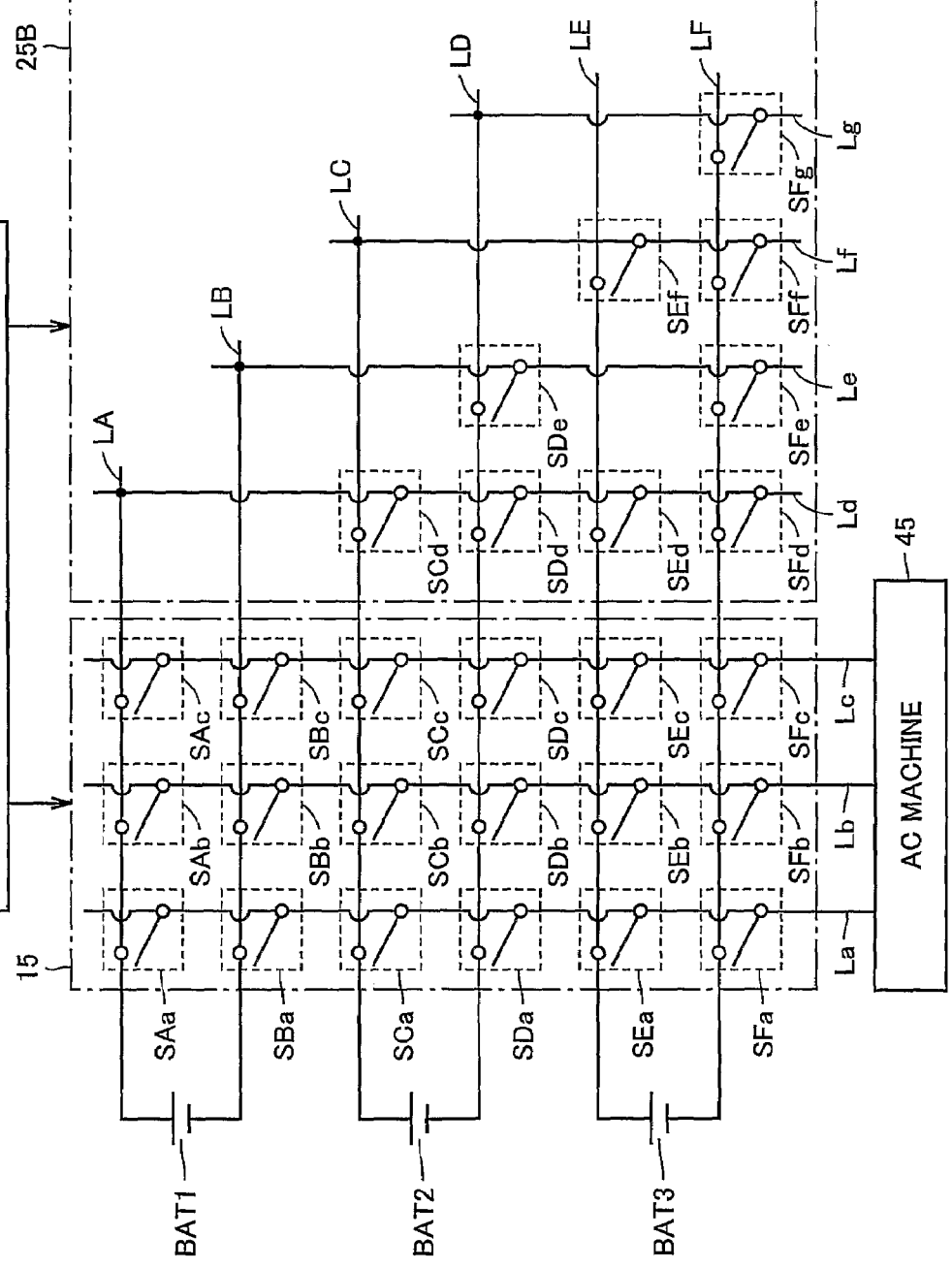

FIG. 21 is an electrical circuit diagram showing an arrangement of the present power conversion device of the third embodiment in a second exemplary variation.

With reference to the figure, a power conversion device 200B corresponds to the FIG. 19 power conversion device 200 having connection portion 25 replaced with a connection portion 25B corresponding to the FIG. 20 connection portion 25A minus switches SCe, SEe, SEg.

Figure 22:
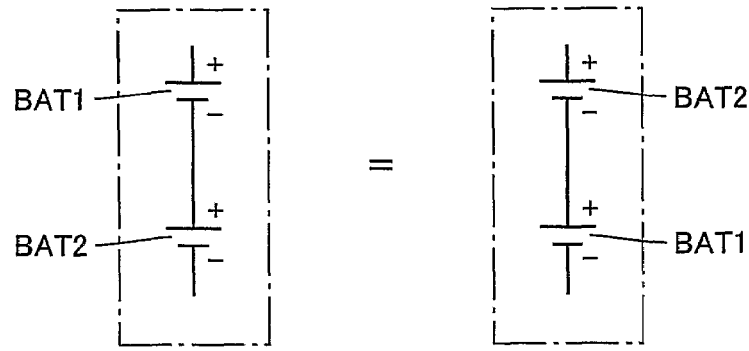
FIG. 22 shows a configuration of connection applied when a battery is forward-, series-connected.

More specifically, as shown in FIG. 22, when batteries are series-, forward-connected, as seen from 3-phase ac machine 45 corresponding to an outputting side, exchanging the order of connection is still considered to provide a similar power supply arrangement, and in the connection portion 25A arrangement, switches SDd connecting power supply lines LA and LD and switch SCe connecting power supply lines LB and LC are redundant for the relationship in the connection between batteries BAT1 and BAT2 and one switch SCe is accordingly eliminated. Similarly, switches SFd, SEe redundant for that in the connection between batteries BAT1 and BAT3 and switches SFf and SEg redundant for that in the connection between batteries BAT2 and BAT3 have their respective one switches SEe and SEg eliminated.

Note that while in the above description, of the redundant switches, switches SCe, SEe, SEg are eliminated, the other switches SDd, SFd, SFf may be eliminated.

Herein, if m dc power supplies are employed and power conversion device 200B is generalized, connection portion 25B has a number N3 of switches, as represented by the following equation:

$$N3 = \sum_{k=1}^{m-1} k \times 3 = \frac{3}{2}(m-1)m. \qquad (3)$$

Third Embodiment in Third Exemplary Variation

Figure 23:
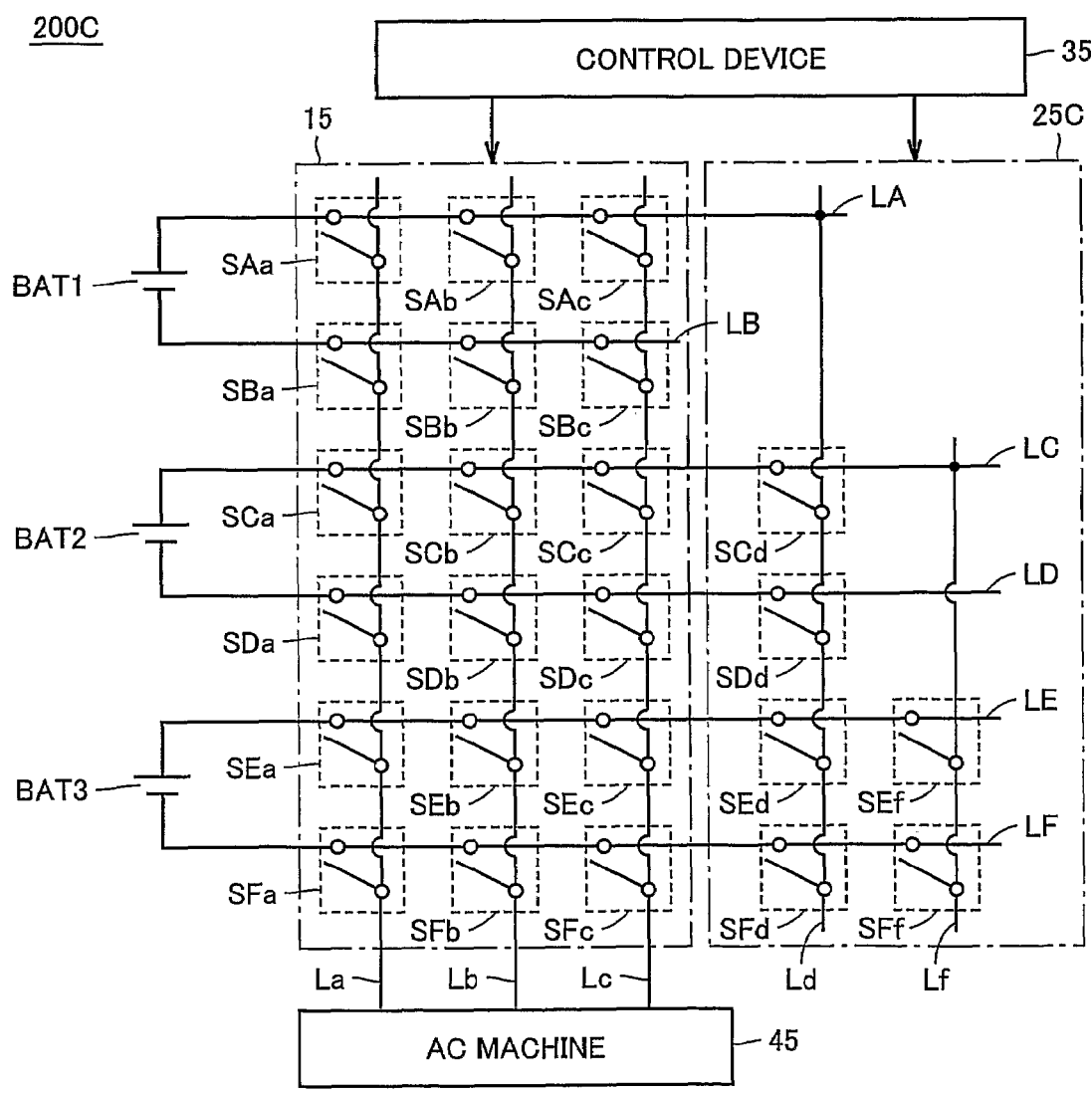
FIG. 23 is an electrical circuit diagram showing a configuration of the present power conversion device of the third embodiment in a third exemplary variation.

FIG. 23 is an electrical circuit diagram showing an arrangement of the present power conversion device of the third embodiment in a third exemplary variation.

With reference to the figure, a power conversion device 200C correspond to the FIG. 19 power conversion device 200 having connection portion 25 replaced with a connection portion 25C corresponding to the FIG. 21 connection portion 25B minus switches SDe, SFe, SFg and power supply lines Le, Lg.

Figure 24:
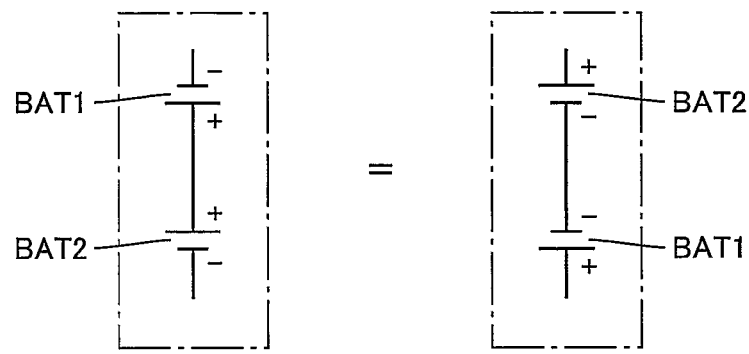
FIG. 24 shows a configuration of connection applied when a battery is reverse-, series-connected.

More specifically, as shown in FIG. 24, when batteries are series-, reverse-connected, as seen from 3-phase ac machine 45 corresponding to an outputting side, exchanging the order of connection is still considered to provide a similar power supply arrangement, and in the connection portion 25B arrangement, switches SCd connecting power supply lines LA and LC and switch SDe connecting power supply lines LB and LD are redundant for the relationship in the connection between batteries BAT1 and BAT2 and one switch SDe is accordingly eliminated. Similarly, switches SEd, SFe redundant for that in the connection between batteries BAT1 and BAT3 and switches SEf and SFg redundant for that in the connection between batteries BAT2 and BAT3 have their respective one switches SFe and SFg eliminated.

Note that while in the above description, of the redundant switches, switches SDe, SFe, SFg are eliminated, the other switches SCd, SEd, SEf may be eliminated. It should be noted in this case, however, that power supply lines Le, Lg cannot be eliminated. Accordingly, in view of miniaturization of the device, switches SDe, SFe, SFg are preferably eliminated.

Herein, if m dc power supplies are employed and power conversion device 200C is generalized, connection portion 25C has a number N4 of switches, as represented by the following equation:

$$N4 = \sum_{k=1}^{m-1} k \times 2 = (m-1)m. \qquad (4)$$

Third Embodiment in Fourth Exemplary Variation

Figure 25:
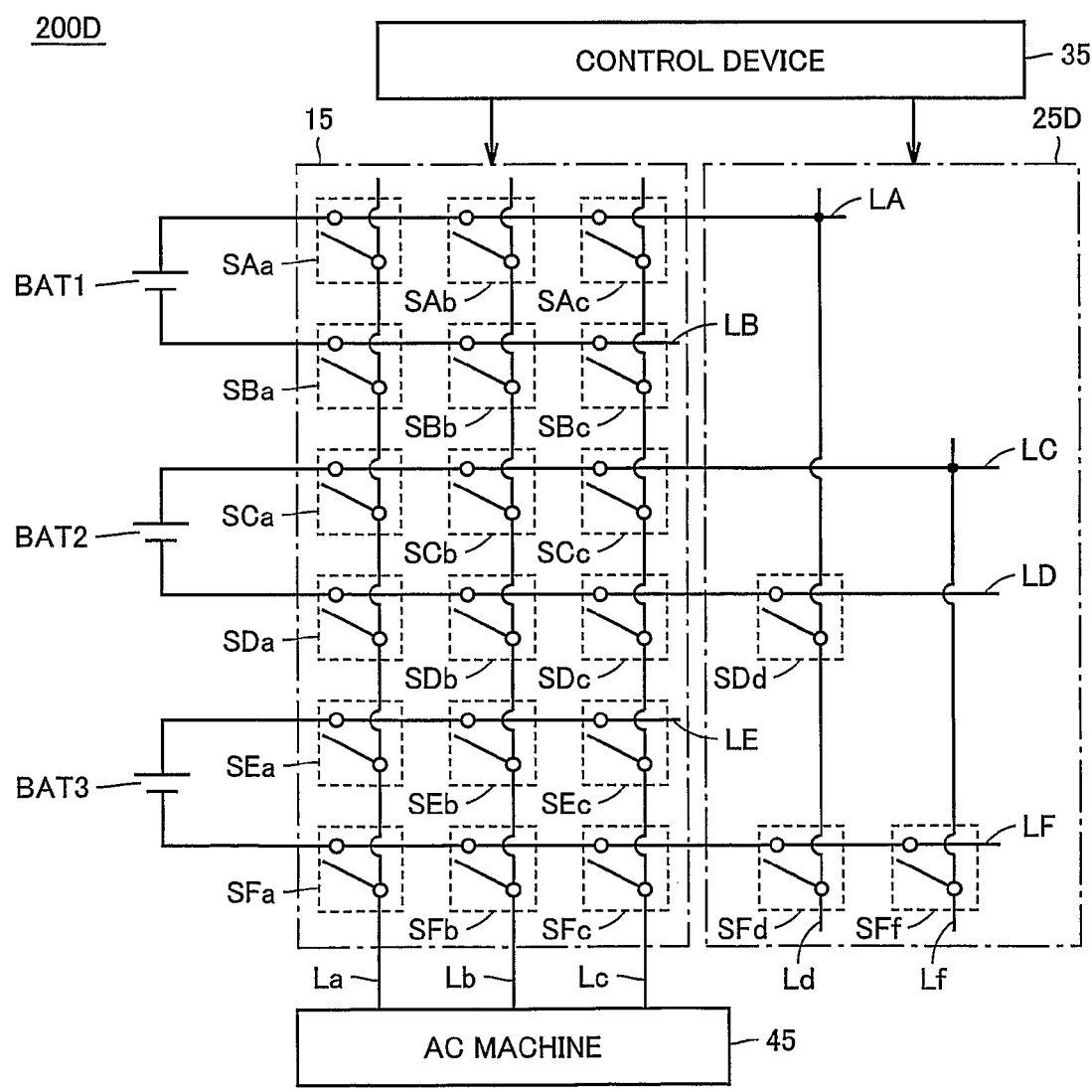
FIG. 25 is an electrical circuit diagram showing a configuration of the present power conversion device of the third embodiment in a fourth exemplary variation.

FIG. 25 is an electrical circuit diagram showing an arrangement of the present power conversion device of the third embodiment in a fourth exemplary variation. With reference to the figure, a power conversion device 200D correspond to the FIG. 19 power conversion device 200 having connection portion 25 replaced with a connection portion 25D corresponding to the FIG. 23 connection portion 25C minus switches SCd, SEd, SEf.

More specifically the third embodiment and its first to third exemplary variations tolerate reverse connection of batteries in connection portions 25-25C, respectively. The third embodiment in the fourth exemplary variation further eliminates switches SCd, SEd, SEf reversely connecting batteries BAT1-BAT3 by providing power conversion portion 15 with a function reversely connecting a battery to compulsorily, directly charge one battery from another battery, and causing connection portion 25 to serve to forward-connect a plurality of batteries to generate dc power of high voltage.

Note that if the third embodiment's fourth exemplary variation employs two dc power supplies, then power conversion device 200D has a configuration corresponding to that of the power conversion device of the first embodiment.

Herein, if m dc power supplies are employed and power conversion device 200D is generalized, connection portion 25D has a number N5 of switches, as represented by the following equation:

$$N5 = \sum_{k=1}^{m-1} k = \frac{1}{2}(m-1)m. \qquad (5)$$

Note that power conversion devices 200 and 200A-200D may be provided with capacitors between power supply lines LA and LB, between power supply lines LC and LD, and between power supply lines LE and LF, respectively, to smooth voltage of dc power supply line. This can reduce an effect on each equipment of a ripple attributed to switching in power conversion portion 15.

Thus in the third embodiment dc power supply batteries BAT1-BAT3 and 3-phase ac machine 45 have a matrix converter connected thereto, and the matrix converter includes power conversion portion 15 converting power between batteries BAT1-BAT3 and 3-phase ac machine 45 and connection portion 25 capable of connecting batteries BAT1-BAT3 in series. This allows connection portion 25 to dynamically convert a circuit configuration between batteries BAT1-BAT3 and 3-phase ac machine 45 in accordance with a power conversion portion in power conversion device 200, and in addition thereto power conversion portion 15 to convert power between batteries BAT1-BAT3 and 3-phase ac machine 45.

Thus a variety of power communications can be achieved between batteries BAT1-BAT3 and 3-phase ac machine 45, and any ac voltage can be generated within a range of maximum dc voltage provided when fuel batteries BAT1-BAT3 are connected in series, and the ac voltage can be supplied to 3-phase ac machine 45. Furthermore, the present power conversion device can dispense with a reactor, a capacitor and the like that conventional power conversion devices are equipped with. Power conversion device 200 can be reduced in size and free of noise attributed to the reactor so that power conversion device 200 can be improved in quietness.

Furthermore in the third embodiment's first to fourth exemplary variations connection portions 25A-25D have an unnecessary switch eliminated in accordance with a condition for connecting batteries BAT1-BAT3. The connection portion can be configured of an appropriate number of switches corresponding to the condition of use of interest, and the power conversion device can be formed of a minimally required number of switches corresponding to the condition of use of interest.

Although the present invention has been described and illustrated in detail, it is clearly understood that the same is by way of illustration and example only and is not to be taken by way of limitation, the spirit and scope of the present invention being limited only by the terms of the appended claims.

The invention claimed is:

1. A power conversion device comprising:
a matrix converter connected to m direct current power supplies and an n-phase alternating current machine, m and n each representing a natural number of at least two; and
a control device controlling an operation of said matrix converter, wherein
said matrix converter includes a power conversion portion operative in response to a control signal received from said control device to convert power between said m direct current power supplies and said n-phase alternating current machine, and a connection portion operative in response to a control signal received from said control device to series connect i ones of said m direct current power supplies, i representing a natural number of at least two and at most m, and
said power conversion portion receives one of direct current power output from each of said m direct current power supplies and that output from said i direct current power supplies series connected by said connection portion to convert said direct current power to alternating current power and output said alternating current power to said n-phase alternating current machine, or receives alternating current power from said n-phase alternating current machine to convert said alternating current power to direct current power and output said direct current power to any of said m direct current power supplies.

2. The power conversion device according to claim 1, wherein said power conversion portion operates in response to said control signal received from said control device to further communicate power between said m direct current power supplies.

3. The power conversion device according to claim 1, wherein: said matrix converter further includes 2×m first power supply lines associated with said m direct current power supplies and connected to m pairs of positive and negative electrodes, respectively, of said m direct current power supplies, and n second power supply lines connected to n input/output terminals, respectively, of said n-phase alternating current machine; and
said power conversion portion is configured of 2×m×n bidirectional switches provided between said 2×m first power supply lines and said n second power supply lines, respectively.

4. The power conversion device according to claim 3, wherein said connection portion is configured of a first switch group including a plurality of switches capable of electrically interconnecting said 2×m first power supply lines.

5. The power conversion device according to claim 4, wherein said connection portion is configured of a second switch group corresponding to said first switch group minus m switches capable of short-circuiting each of m pairs of first power supply lines connected to said m direct current power supplies, respectively.

6. The power conversion device according to claim 5, wherein said connection portion is configured of a third switch group corresponding to said second switch group minus a switch by connecting a plurality of series-, forward-connected direct current power supplies in random order.

7. The power conversion device according to claim 6, wherein said connection portion is configured of a fourth switch group corresponding to said third switch group minus a switch by connecting a plurality of series-, reverse-connected direct current power supplies in random order.

8. The power conversion device according to claim 6, wherein said connection portion is configured of a fourth switch group corresponding to said third switch group minus a switch series-, reverse-connecting a plurality of direct current power supplies.

9. The power conversion device according to claim 4, wherein when said power conversion portion receiving alternating current power from said n-phase alternating current machine converts said alternating current power to direct current power and outputs said direct current power to any of said m direct current power supplies any switch included in said connection portion is turned off.

10. The power conversion device according to claim 3, wherein said power conversion portion has 2×j×n bidirectional switches replaced with 2×j×n monodirectional switches provided between 2×j first power supply lines connected to j direct current power supplies non-chargeable from said positive and negative electrodes and said n second power supply lines, respectively, j being a natural number smaller than m.

11. The power conversion device according to claim 3, further comprising m capacitors associated with said m direct current power supplies and each connected between first power supply lines of a pair connected to a corresponding one of said direct current power supplies.

12. The power conversion device according to claim 3, wherein:
said m direct current power supplies include a fuel cell and a secondary battery;
said n-phase alternating current machine is implemented by a 3-phase alternating current rotary electric machine;

said power conversion portion includes six monodirectional switches provided between a pair of first power supply lines connected to positive and negative electrodes, respectively, of said fuel cell and three second power supply lines connected to phase coils, respectively, of said 3-phase alternating current rotary electric machine, and six bidirectional switches provided between another pair of first power supply lines connected to positive and negative electrodes, respectively, of said secondary battery (BAT) and said three second power supply lines; and said connection portion is configured of a bidirectional switch provided between one of said first power supply lines of said pair connected to said negative electrode of said fuel cell and one of said first power supply lines of said other pair connected to said positive electrode of said secondary battery or between the other of said first power supply lines of said pair connected to said positive electrode of said fuel cell and the other of said first power supply lines of said other pair connected to said negative electrode of said secondary battery.

13. The power conversion device according to claim 12, further comprising m capacitors associated with said m direct current power supplies and each connected between first power supply lines of a pair connected to a corresponding one of said direct current power supplies.

14. The power conversion device according to claim 12, wherein when said 3-phase alternating current rotary electric machine outputs alternating current power to said power conversion portion in a regeneration operation and said 3-phase alternating current rotary electric machine provides a maximum electromotive voltage of at least an inter-terminal voltage of said secondary battery, said control device outputs a control command to said 3-phase alternate rotary electric machine to reduce a rotation rate thereof, said 3-phase alternating current rotary electric machine operates a mechanical brake in response to said control command to reduce said rotation rate, and after said rotation rate is reduced said power conversion portion receiving alternating current power from said n-phase alternating current rotary electric machine converts said alternating current power to direct current power and outputs said direct current power to any of said m direct current power supplies.

15. The power conversion device according to claim 14, wherein said control device reduces said rotation rate of said 3-phase alternating current rotary electric machine to reduce said maximum electromotive voltage to be lower than said inter-terminal voltage.

16. The power conversion device according to claim 12, wherein when said 3-phase alternating current rotary electric machine outputs alternating current power to said power conversion portion in a regeneration operation and said 3-phase alternating current rotary electric machine provides a maximum electromotive voltage of at least an inter-terminal voltage of said secondary battery, said control device further controls an operation of said matrix converter to weaken a magnetic field of said 3-phase alternate rotary electric machine, and after said magnetic field is weakened said power conversion portion receiving alternating current power from said n-phase alternating current rotary electric machine converts said alternating current power to direct current power and outputs said direct current power to any of said m direct current power supplies.

17. The power conversion device according to claim 16, wherein said control device controls said operation of said matrix converter to weaken said magnetic field to reduce said maximum electromotive voltage to be smaller than said inter-terminal voltage.

18. The power conversion device according to claim 16, wherein said control device controls said operation of said matrix converter to generate a d axis current for weakening said magnetic field of said 3-phase alternating current rotary electric machine.

19. The power conversion device according to claim 18, wherein said control device turns on said monodirectional switch in said connection portion.

20. A vehicle comprising:
   m direct current power supplies, m representing a natural number of at least two;
   an n-phase alternating current rotary electric machine, n representing a natural number of at least two; and
   the power conversion device according to claim 1 provided between said m direct current power supplies and said n-phase alternating current rotary electric machine.

21. The vehicle according to claim 20, wherein said m direct current power supplies include at least one fuel cell and at least one secondary battery.

22. The vehicle according to claim 21, wherein when said n-phase alternating current rotary electric machine regeneratively operates, said matrix converter receives n-phase alternating current power from said n-phase alternating current rotary electric machine and converts said n-phase alternating current power to direct current power to charge said at least one secondary battery therewith.

23. The vehicle according to claim 20, wherein said matrix converter connects i ones of said m direct current power supplies in series in accordance with a level of power supplied to said n-phase alternating current rotary electric machine, and receives direct current power generated by said i, series connected direct current power supplies to convert said direct current power to n-phase alternating current power and supply said n-phase alternating current power to said n-phase alternating current rotary electric machine, i being a natural number of at most m.

24. The vehicle according to claim 20, wherein when said m direct current power supplies mutually communicate power, said control device controls an operation of said matrix converter to generate a voltage pattern providing said n-phase alternating current rotary electric machine with a q axis current of 0.

* * * * *